(12) United States Patent
Cho et al.

(10) Patent No.: US 10,787,470 B2
(45) Date of Patent: Sep. 29, 2020

(54) METHOD FOR MAKING A SOLID-SUPPORTED PHOSPHOLIPID BILAYER

(71) Applicant: NANYANG TECHNOLOGICAL UNIVERSITY, Singapore (SG)

(72) Inventors: Nam-Joon Cho, Singapore (SG); Joshua Alexander Jackman, Singapore (SG)

(73) Assignee: NANYANG TECHNOLOGICAL UNIVERSITY, Singapore (SG)

( * ) Notice: Subject to any disclaimer, the term of this patent is extended or adjusted under 35 U.S.C. 154(b) by 0 days.

(21) Appl. No.: 16/486,295

(22) PCT Filed: Feb. 14, 2018

(86) PCT No.: PCT/SG2018/050072
§ 371 (c)(1),
(2) Date: Aug. 15, 2019

(87) PCT Pub. No.: WO2018/151679
PCT Pub. Date: Aug. 23, 2018

(65) Prior Publication Data
US 2020/0040017 A1   Feb. 6, 2020

Related U.S. Application Data

(60) Provisional application No. 62/459,324, filed on Feb. 15, 2017.

(51) Int. Cl.
*C07F 9/10* (2006.01)
*B05D 3/00* (2006.01)
(Continued)

(52) U.S. Cl.
CPC .............. *C07F 9/106* (2013.01); *B05D 3/007* (2013.01); *B05D 7/24* (2013.01); *B05D 2203/30* (2013.01); *B05D 2401/10* (2013.01); *B82Y 40/00* (2013.01)

(58) Field of Classification Search
CPC ............ C07F 9/106; B05D 3/007; B05D 7/24
(Continued)

(56) References Cited

U.S. PATENT DOCUMENTS

2007/0087328 A1   4/2007   Sleytr et al.

OTHER PUBLICATIONS

Morigaki et al., Formation of Substrate-Supported Membranes from Mixtures of Long and Short Chained Phospholipids, Langmuir, 20, pp. 9649-9655, 2012.*
(Continued)

*Primary Examiner* — Deborah D Carr
(74) *Attorney, Agent, or Firm* — Alston & Bird LLP

(57) ABSTRACT

A method of preparing a solid-supported phospholipid bilayer is provided. The method includes a) a first step of providing a solution comprising a bicellar mixture of a long-chain phospholipid and a short-chain phospholipid; b) at least one second step of decreasing the temperature of the solution to below 0° C., increasing the temperature to above room temperature and causing the solution to be blended; and c) a third step of depositing the solution obtained after the second step on a surface of a support, wherein the concentration of the long-chain phospholipid in the solution is at most 0.1 mg/mL, for obtaining a solid-supported phospholipid bilayer. A solid-supported phospholipid layer obtained by the method as defined above is also provided.

19 Claims, 19 Drawing Sheets

(51) Int. Cl.
     B05D 7/24    (2006.01)
     B82Y 40/00   (2011.01)
(58) Field of Classification Search
     USPC .......................................................... 554/78
     See application file for complete search history.

(56) References Cited

OTHER PUBLICATIONS

Boudard, S. et al., *Controlling the Pathway of Formation of Supported Lipid Bilayers of DMPC by Varying the Sodium Chloride Concentration*, Thin Solid Films, 495 (2006) 246-251.
Chan, Y-H. M. et al., *Model Membrane Systems and Their Applications*, Current Opinion in Chemical Biology, 11 (2007) 581-587.
Cho, N-J. et al., *Quartz Crystal Microbalance with Dissipation Monitoring of Supported Lipid Bilayers on Various Substrates*, Nature Protocols, vol. 5, No. 6 (2010) 1096-1106.
Choi, M. J. et al., *Elastic Vesicles as Topical/Transdermal Drug Delivery Systems*, International Journal of Cosmetic Science, 27 (2005) 211-221.
Cremer, P. S. et al., *Formation and Spreading of Lipid Bilayers on Planar Glass Supports*, J. Phys. Chem., B 103 (1999) 2254-2259.
Dacic, M. et al., *Influence of Divalent Cations on Deformation and Rupture of Adsorbed Lipid Vesicles*, Langmuir, 32 (2016) 6486-6495.
De Angelis, A. A. et al., *Bicelle Samples for Solid-State NMR of Membrane Proteins*, Nature Protocols, vol. 2, No. 10 (2007) 2332-2338.
Egawa, H. et al., *Liposome Adhesion on Mica Surface Studied by Atomic Force Microscopy*, Langmuir, 15 (1999) 1660-1666.
Glasmästar, K. et al., *Protein-Adsorption on Supported Phospholipid Bilayers*, Journal of Colloid and Interface Science, 246 (2002) 40-47.
Glover, K. J. et al., *Structural Evaluation of Phospholipid Bicelles for Solution-State Studies of Membrane-Associated Biomolecules*, Biophysical Journal, vol. 81 (Oct. 2001) 2163-2171.
Hohner, A. O. et al., *Controlled Solvent-Exchange Deposition of Phospholipid Membranes Onto Solid Surfaces*, Biointerphases, 5(1) (Mar. 2010) 1-8.
Jackman, J. A. et al., *Biotechnology Applications of Tethered Lipid Bilayer Membranes*, Materials, 5 (2012) 2637-2657.
Jackman, J. A. et al., *Self Assembly Formation of Lipid Bilayer Coatings on Bare Aluminum Oxide: Overcoming the Force of Interfacial Water*, ACS Appl. Mater. Interfaces, 7 (205) 959-968.
Jackman, J. A. et al., *Vesicle Adhesion and Rupture on Silicon Oxide: Influence of Freeze-Thaw Pretreatment*, Lamgmuir, 30 (2014) 2152-2160.
Jönsson, P. et al., *A Method Improving the Accuracy of Fluorescence Recovery After Photobleaching Analysis*, Biophysical Journal, vol. 95 (Dec. 2008) 5334-5348.
Keller, C. A. et al., *Formation of Supported Membranes From Vesicles*, Physical Review Letters, vol. 84, No. 23 (Jun. 2000) 5443-5446.
Keller, C. A. et al., *Surface Specific Kinetics of Lipid Vesicle Adsorption Measured With a Quartz Crystal Microbalance*, Biophysical Journal, vol. 75 (Sep. 1998) 1397-1402.
Kim, M. C. et al., *Supported Lipid Bilayer Repair Mediated by AH Peptide*, Physl. Chem. Chem. Phys., 18 (2016) 3040-3047.
Lenhert, S. et al., *Massively Parallel Dip-Pen Nanolithography of Heterogeneous Supported Phospholipid Multilayer Patterns*, Small, 3, No. 1 (2007) 71-75.
Losonczi, J. A. et al., *Improved Dilute Bicelle Solutions for High-Resolution NMR of Biological Macromolecules*, Journal of Biomolecular NMR, 12 (1998) 447-451.
Lu, Z. et al., *Bicelles at Low Concentrations*, Mol. Pharmaceutics, 9 (2012) 752-761.
MacDonald, R. C. et al., *Fragmentation Into Small Vesicles of Dioleoylphosphatidycholine Bilayers During Freezing and Thawing*, Biochimica et Biophysica Acta, 1191 (1994) 362-370.

Mager, M. D. et al., *Lipid Bilayer Deposition and Patterning Via Air Bubble Collapse*, Langmuir, 23 (2007) 9369-9377.
Mennicke, U. et al., *Preparation of Solid-Supported Lipid Bilayers by Spin-Coating*, Langmuir, 18 (2002) 8172-8177.
Morigaki, K. et al., *Formation of Substrate-Supported Membranes From Mixtures of Long- and Short-Chain Phospholipids*, Langmuir, 28 (2012) 9649-9655.
Morrison, E. A. et al., *Reconstitution of Integral Membrane Proteins Into Isotropic Bicelles With Improved Sample Stability and Expanded Lipid Composition Profile*, Biochimica et Biophysica Acta, 118 (2012) 814-820.
Nieh, M-P. et al., *Magnetically Alignable Phase of Phospholipid "Bicelle" Mixtures is a Chiral Nematic Made Up of Worklike Micelles*, Langmuir, 20 (2004) 7893-7897.
Otten, D, et al., *Softening of Membrane Bilayers by Detergents Elucidated by Deuterium NMR Spectroscopy*, J. Phys. Chem., B 104 (2000) 12119-12129.
Palladino, P. et al, *Ionic Strength Effects on the Critical Micellar Concentration of Ionic and Nonionic Surfactants: The Binding Model*, Langmuir, 27 (2011) 14065-14070.
Ram, P. et al., *Magnetic Field Induced Ordering of Bile Salt/Phospholipid Micelles: New Media for NMR Structural Investigations*, Biochimica et Biophysica Acta, 940 (1988) 289-294.
Reimhult, E. et al., *Vesicle Adsorption on $SiO_2$ and $TiO_2$: Dependence on Vesicle Size*, Journal of Chemical Physics, vol. 117, No. 16 (Oct. 2002) 7401-7404.
Richter, R. P. et al., *Formation of Solid-Supported Lipid Bilayers: An Integrated View*, Langmuir, 22 (2006) 3497-3505.
Rodriguez, G. et al., *A Unique Bicellar Nanosystem Combining Two Effects on Stratum Corneum Lipids*, Mol. Pharmaceutics, 9 (2012) 482-491.
Rodriguez, G. et al., *Characterization of New DOPC/DHPC Platform for Dermal Applications*, Eur Biophys J, 42 (2013) 333-345.
Sackmann, E., *Supported Membranes: Scientific and Practical Applications*, Science, vol. 27 (Jan. 1996) 43-48.
Saleem,Q. et al., *Single Lipid Bilayer Deposition on Polymer Surfaces Using Bicelles*, Biomacromolecules, 16 (2015) 1032-1039.
Sanders, C. R. et al., *Customizing Model Membranes and Samples for NMR Spectroscopic Studies of Complex Membrane Proteins*, Biochimica et Biophysica Acta, 158 (2000) 129-145.
Seantier, B. et al., *In Situ Investigations of the Formation of Mixed Supported Lipid Bilayers Close to the Phase Transition Temperature*, Nano Letters, vol. 4, No. 1 (2004) 5-10.
Sternin, E. et al., *Temperature Dependence of BMPC/DHPC Mixing in a Bicellar Solution and Its Structural Implications*, Langmuir, 17 (2001) 2610-2616.
Sundh, M. et al., *Influence of Phase Separating lipids on Supported Lipid Bilayer Formation at $SiO_2$ Surfaces*, Phys. Chem. Chem. Phys., 12 (2010) 453-460.
Tabaei, S. R. et al., *Formation of Cholesterol-Rich Supported Membranes Using Solvent-Assisted Lipid Self-Assembly*, Langmuir, 30 (2014) 13345-13352.
Tabaei, S. R. et al., *Self-Assembly Formation of Multiple DNA-Tethered Lipid Bilayers*, Journal of Structural Biology, 168 (2009) 200-206.
Tabaei, S. R. et al., *Solvent-Assisted Lipid Bilayer Formation on Silicon Dioxide and Gold*, Langmuir, 30 (2014) 10363-10373.
Tabaei, S. R. et al., *Solved-Assisted Lipid Self-Assembly at Hydrophilic Surfaces: Factors Influencing the Formation of Supported Membranes*, Langmuir, 31 (2015) 3125-3134.
Tamm, L. K. et al., *Supported Phospholipid Bilayers*, Biophys. J., vol. 47 (Jan. 1985) 105-113.
Tausk, R. J. M. et al., *Physical Chemical Studies of Short-Chain Lecithin Homologues. I. Influence of the Chain Length of the Fatty Acid Ester and of Electrolytes on the Critical Micelle Concentration*, Biophysical Chemistry, 1 (1974) 175-183.
Tiberg, F. et al., *Formation of Model Lipid Bilayers at the Silica-Water Interface by Co-Adsorption With Non-Ionic Dodecyl Maltoside Surfactant*, Eur Biophys J, 29 (2000) 196-203.
Triba, M. N. et al., *Effects of Lipid Chain Length and Unsaturation on Bicelles Stability. A Phosphorus NMR Study*, Biophysical Journal, vol. 91 (Aug. 2006) 1357-1367.

(56) References Cited

OTHER PUBLICATIONS

Triba, M. N. et al., *Reinvestigation by Phosphorus NMR of Lipid Distribution in Bicelles*, Biophysical Journal, vol. 88 (Mar. 2005) 1887-1901.
Van Dam, L. et al., *Direct Observation and Characterization of DMPC/DHPC Aggregates Under Conditions Relevant for Biological Solution NMR*, Biochimica et Biophysica Acta, 1664 (2004) 241-256.
Weirich, K. L. et al., *Bilayer Edges Catalyze Supported Lipid Bilayer Formation*, Biophysical Journal, vol. 98 (Jan. 2010) 85-92.
Yoon, B. K. et al., *Spectrum of Membrane Morphological Responses to Antibacterial Fatty Acids and Related Surfactants*, Langmuir, 31 (2015) 10223-10232.
Yorulmaz, S. et al., *Membrane Attack Complex Formation on a Supported Lipid Bilayer: Initial Steps Towards a CARPA Predictor Nanodevice*, Eur. J. Nanomed., 7(3) (2015) 245-255.
Yorulmaz, S. et al., *Supported Lipid Bilayer Platform to Test Inhibitors of the Membrane Attack Complex: Insights Into Biomacromolecular Assembly and Regulation*, Biomacromolecules, 16 (2015) 3594-3602.
Zasadzinski, J.A.N. et al., *Atomic Force Microscopy of Hydrated Phosphatidylethanolamine Bilayers*, Biophys. J., vol. 59 (Mar. 1991) 755-760.
Zeineldin, R. et al., *Using Bicellar Mixtures to Form Supported and Suspended Lipid Bilayers on Silicon Chips*, Langmuir, 22 (2006) 8163-8168.
Zhao, Z. et al., *Viscoelasticity of Poly(ethylene glycol) Solutions on Supported Lipid Bilayers Via Quartz Crystal Microbalance With Dissipation*, Macromolecules, 48 (2015) 1824-1831.
Zhdanov, V. P. et al., *Simulation of Adsorption Kinetics of Lipid Vesicles*, Journal of Chemical Physics, vol. 112, No. 2 (Jan. 2000) 900-909.
Zwang, T. J. et al., *Quantification of the Layer of Hydration of a Supported Lipid Bilayer*, Langmuir, 26(7) (2010) 4598-4601.
International Search Report and Written Opinion for Application No. PCT/SB2018/050072 dated Apr. 11, 2018, 9 pages.

* cited by examiner

METHOD FOR MAKING A SOLID-SUPPORTED PHOSPHOLIPID BILAYER

CROSS-REFERENCE TO RELATED APPLICATIONS

The present application is a national phase entry of PCT/SG2018/050072, filed on 14 Feb. 2018, which claims the benefit of priority of U.S. provisional patent application No. 62/459,324 filed on 15 Feb. 2017, the entire contents of which are incorporated herein by reference in their entirety for all purposes.

TECHNICAL FIELD

Various embodiments relate to a solid-supported phospholipid bilayer and a method of preparing the solid-supported phospholipid bilayer.

BACKGROUND

Planar supported lipid bilayers (SLBs) are widely used experimental platforms that mimic the architecture of biological membranes and are compatible with various surface-sensitive measurement techniques. SLBs are primarily used to study membrane-associated interaction processes involving biomolecules (e.g., lipids, proteins, sugars, nucleic acids). While there are numerous fabrication techniques used to prepare micron-scale lipid bilayers on solid supports such as air-bubble collapse, spin-coating, and dip-pen nanolithography, the formation of homogenous, planar SLBs across longer length scales is more challenging and limited to fewer techniques. The most commonly used method for fabricating planar SLBs is the adsorption and spontaneous rupture of phospholipid vesicles as well as Langmuir-type deposition processes, the latter of which requires specialized instrument setups. Vesicle adsorption and rupture has increasingly become the most commonly used method, however, the technique requires well-prepared vesicle suspensions with tuned properties and typically works on only a subset of hydrophilic surfaces, including silicon dioxide, borosilicate glass and mica. Furthermore, successful bilayer formation depends on many parameters such as ionic strength, addition of divalent cations, and solution pH that must be carefully considered for the particular system under investigation. In addition, spontaneous rupture of adsorbed vesicles only works for vesicles with membrane compositions that are amenable to the fusion-rupture mechanism—cholesterol at relatively high concentrations (25 mol % or higher) is a common component that impedes SLB formation via this mechanism. As a result, such limitations have motivated the further exploration of additional user-friendly methods to fabricate SLBs that require less preparation and utilize other means of phospholipid self-assembly.

Towards this goal, the solvent-assisted lipid bilayer formation (SALB) method has emerged as a robust, bottom-up approach to form SLBs without requiring lipid vesicles. Early work by Hohner et al. discovered that lipids in isopropanol can be deposited on a silica substrate, and gradual exchange with water-isopropanol mixtures containing increasing water fractions induces a series of phase transitions that ultimately yield an SLB. Towards a more practical implementation of this concept, Tabaei et al. developed the SALB method in which lipids in a water-miscible organic solvent (i.e., isopropanol, ethanol, or methanol) are deposited on a solid support and then subjected to a rapid solvent-exchange with aqueous buffer solution in order to form an SLB Importantly, the SALB approach has proven successful at forming SLBs on a wide range of substrates, including silicon oxide, gold, aluminum oxide, and titanium oxide—the latter four of which are intractable to conventional vesicle adsorption and spontaneous rupture. It has also enabled the formation of SLBs containing high fractions of cholesterol (up to 60 mol %). At the same time, the SALB approach is sensitive to the solvent-exchange flow conditions and bulk lipid concentration, requiring a minimum lipid concentration for successful SLB formation (0.1 mg/mL or higher) as well as lipid deposition in organic solvents.

Alternative SLB fabrication strategies that also bypass conventional vesicle preparation needs while further enabling operation in fully aqueous conditions would be advantageous. To this end, one promising approach involves the formation of supported lipid bilayers from bicellar mixtures composed of long-chain and short-chain phospholipids. It is understood that bicellar mixtures form disk-like aggregates, with edges stabilized by short-chain phospholipids, and these so-called "bicelles" have proven useful in structural biology studies. Bicellar mixtures can form a variety of structures depending on factors such as the total lipid-detergent concentration, temperature of the bicellar mixture, and the lipid-to-detergent ratio (commonly referred to as the q-ratio). Given their two-dimensional, disk-like membrane properties, bicellar mixtures have also proven to be an interesting tool to fabricate SLBs. Zeineldin et al. first reported bilayer formation on silicon chips from a bicellar mixture of zwitterionic DPPC (Dipalmitoylphosphatidylcholine) and 1,2-diheptanoyl-sn-glycero-3-phosphocholine ($DHPC_7$) lipids with a q-ratio of 2.8. Following this work, Tabaei et al. performed quartz crystal microbalance-dissipation (QCM-D) measurements in order to characterize the mass and viscoelastic properties of adsorbed $DMPC/DHPC_6$ (DMPC: 1,2-Dimyristoyl-sn-glycero-3-phosphorylcholine; $DHPC_6$: 1,2-dihexyanoyl-sn-glycero-3-phosphocholine) bicellar mixtures at a q-ratio of 2.8, and discovered that the structures adsorb onto the silica surface and aggregate due to lack of electrostatic repulsion. To form single SLBs, it was necessary to add a small fraction of a water-soluble cationic surfactant (CTAB) to the bicellar mixtures, effectively preventing bicelle aggregation and allowing SLB formation based on fusion of adsorbed, planar bicelle fragments. More recently, Morigaki et al. reported that zwitterionic $POPC/DHPC_6$ and $POPC/DHPC_7$ (POPC: 1-palmitoyl-2-oleoyl-sn-glycero-3-phosphocholine) mixtures across a wide range of q-ratios (0.05 to 10) can form SLBs on silica and discussed how inclusion of short-chain phospholipids accelerates SLB formation but can also perturb SLBs due to surfactant-like membrane disruption. In summary, the existing strategies to prepare high-quality supported lipid bilayers from bicellar mixtures require very high lipid concentrations compared to other fabrication methods and cannot form good-quality bilayers.

Hence, there remains a need for the development of methods to prepare high-quality solid-supported phospholipid bilayers from bicellar mixtures.

SUMMARY

In a first aspect, a method of preparing a solid-supported phospholipid bilayer is provided. The method comprises
 a) a first step of providing a solution comprising a bicellar mixture of a long-chain phospholipid and a short-chain phospholipid;

b) at least one second step of decreasing the temperature of the solution to below 0° C., increasing the temperature to above room temperature and causing the solution to be blended; and c) a third step of depositing the solution obtained after the second step on a surface of a support, wherein the concentration of the long-chain phospholipid in the solution is at most 0.1 mg/mL, for obtaining a solid-supported phospholipid bilayer.

In a second aspect, there is provided a solid-supported phospholipid bilayer. The phospholipid bilayer is obtained by the method as described above.

BRIEF DESCRIPTION OF THE DRAWINGS

The invention will be better understood with reference to the detailed description when considered in conjunction with the non-limiting examples and the accompanying drawings, in which.

DETAILED DESCRIPTION

Figure 1:
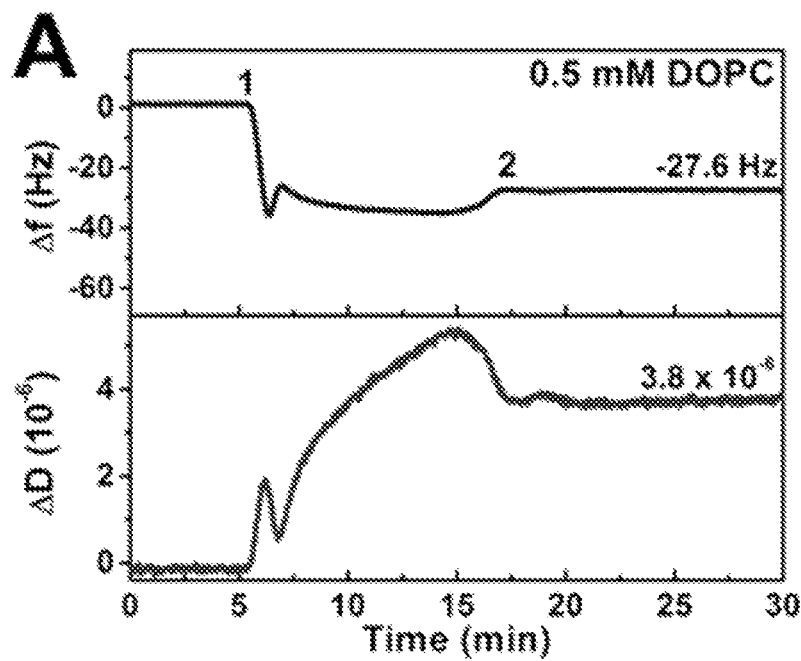
FIG. 1 shows a Quartz Crystal Microbalance-Dissipation (QCM-D) measurement of SLB formation from bicellar mixtures prepared at a q-ratio of 0.05. $\Delta f$ (top line) and $\Delta D$ (bottom line) shifts as a function of time are presented for (A) 0.5 mM DOPC, (B) 0.25 mM DOPC, (C) 0.13 mM DOPC, (D) 0.063 mM DOPC, (E) 0.031 mM DOPC and (F) 0.016 mM DOPC. Bicellar mixtures were added at t=5 minutes (step 1), and a washing step was then performed.
Figure 1:
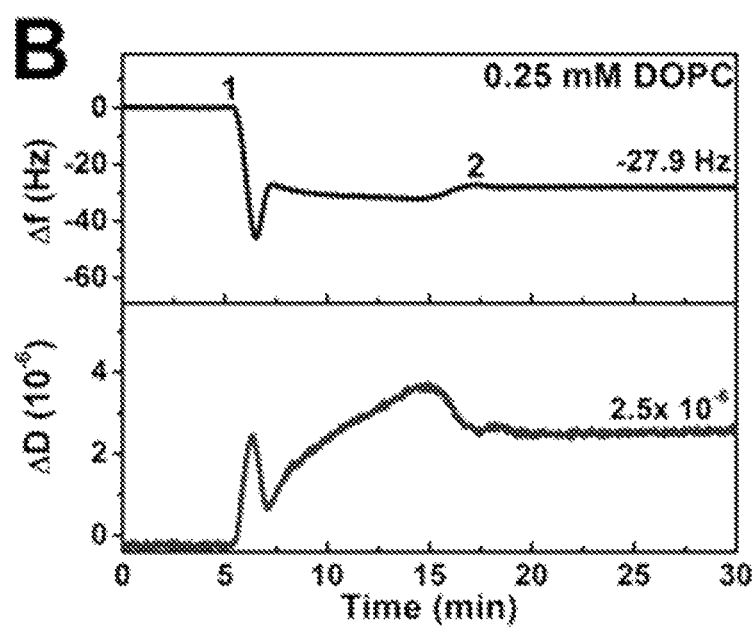
Figure 1:
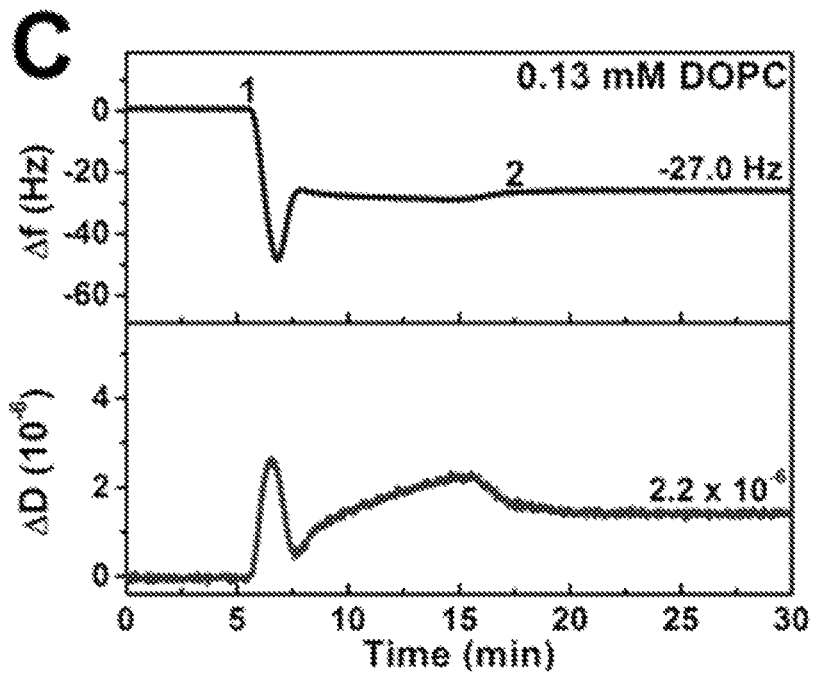
Figure 1:
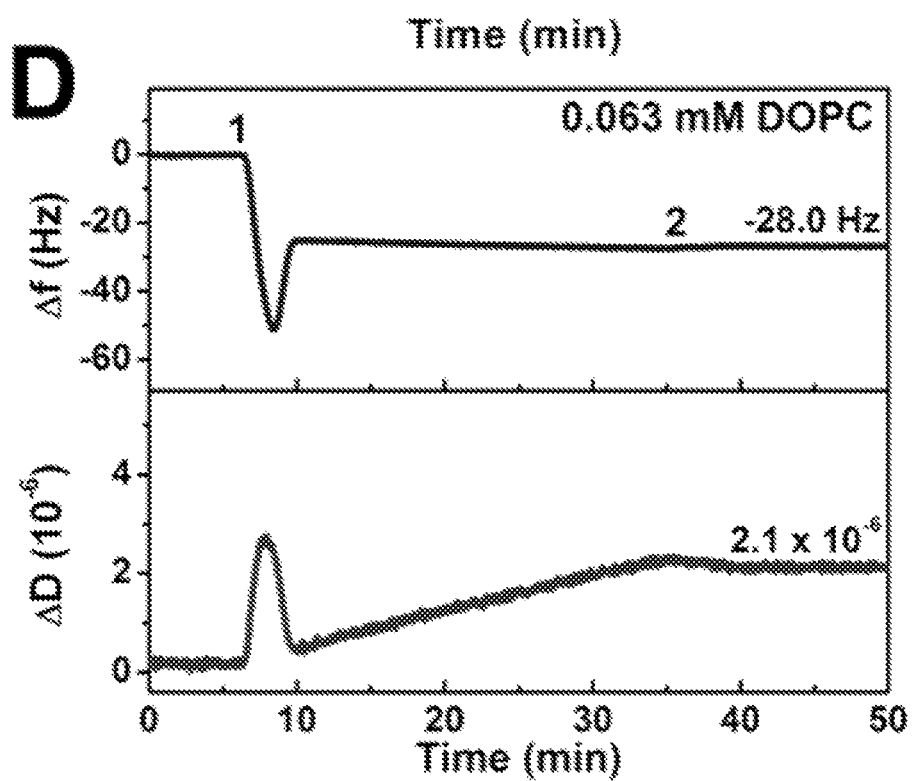
Figure 1:
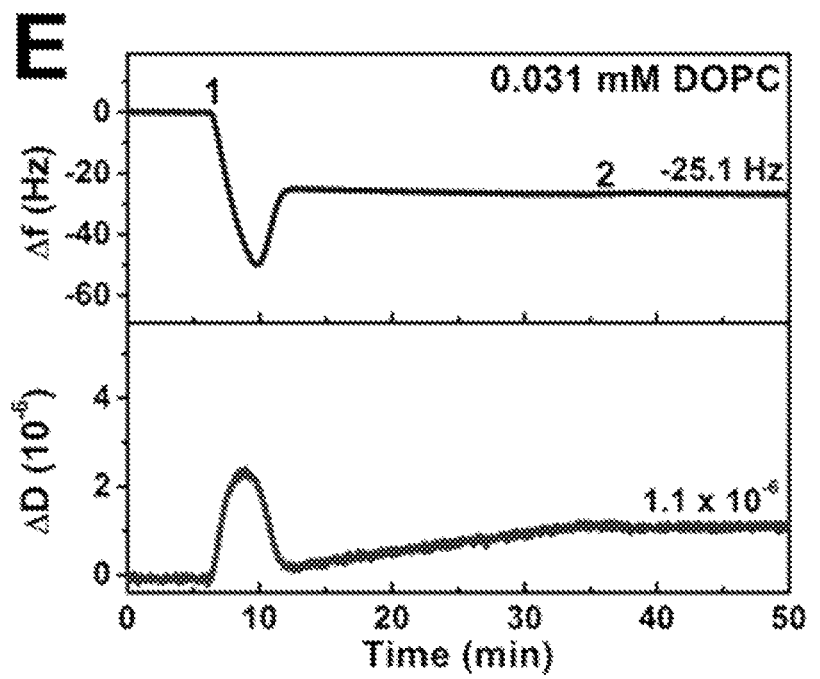
Figure 1:
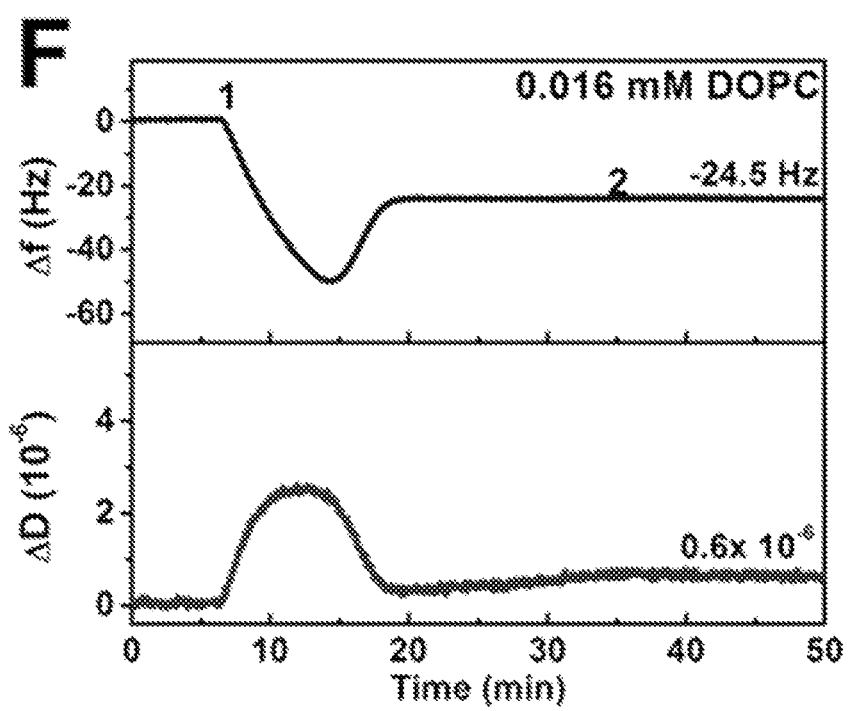

Various embodiments refer in a first aspect to a method of preparing a solid-supported phospholipid bilayer. The method comprises a) a first step of providing a solution comprising a bicellar mixture of a long-chain phospholipid and a short-chain phospholipid; b) at least one second step of decreasing the temperature of the solution to below 0° C., increasing the temperature to above room temperature and causing the solution to be blended; and c) a third step of depositing the solution obtained after the second step on a surface of a support, wherein the concentration of the long-chain phospholipid in the solution is at most 0.1 mg/mL, for obtaining a solid-supported phospholipid bilayer.

The term "phospholipid bilayer" as used herein refers to a membrane which substantially consists of two layers, wherein each layer substantially consists of phospholipids. The layers are arranged in such a way, that they have a hydrophobic interior and a hydrophilic exterior. Each phospholipid molecule has a hydrophilic portion, which is in general the phosphorous-containing functional group, and a hydrophobic portion, which is an alkyl or alkylene chain resulting from a fatty acid. The hydrophobic interior therefore comprises the hydrophobic fatty acid alkyl/alkylene chains, whereas the hydrophilic exterior comprises the phosphorous-containing functional group. The hydrophilic portion, which is in general the phosphorous-containing functional group, may be any phosphate ester, which carries at least one negative charge in order to exhibit hydrophilicity. Illustratively, a phospholipid may be described by the Formula (I):

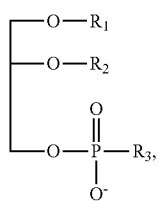

(I)

wherein each $R_1$ and $R_2$ individually represent a long chain saturated or unsaturated fatty acid moiety and $R_3$ is selected from oxide ($O^-$) or a moiety $OR_4$, wherein $R_4$ may be selected from the group consisting of an optionally substituted $C_{1-20}$ alkyl, an optionally substituted $C_{1-20}$ cycloalkyl and an amino acid.

The optionally substituted $C_{1-20}$ alkyl may be selected from the group consisting of a $C_{1-20}$ alkylalcohol or a $C_{1-20}$ alkylamine.

The $C_{1-20}$ alkylalcohol may refer to a $C_{1-20}$ alkyl chain which is substituted with 1 to 5 hydroxy moieties. When $R_4$ is a $C_{1-20}$ alkylalcohol, $R_3$ may therefore be, for example, glycerol.

The $C_{1-20}$ alkylamine may refer to a $C_{1-20}$ alkyl chain which is substituted with 1 to 5 amine moieties. The amine moieties may optionally be further alkylated, optionally with 1 to 3 alkyl moieties. Hence, the at least one amine moiety within $R_4$ may be an ammonium cation. Advantageously, in embodiments wherein $R_4$ comprises an ammonium moiety, $R_3$ would comprise an additional charged moiety, which contributes to a higher hydrophilicity within the phosphorous-containing functional group. When $R_4$ is a $C_{1-20}$ alkylamine, wherein the $C_{1-20}$ alkylamine comprises the amine as an ammonium moiety, $R_3$ may therefore be, in one example, choline.

When $R_4$ is a $C_{1-20}$ alkylamine, wherein the $C_{1-20}$ alkylamine comprises an unsubstituted amine moiety, $R_3$ may therefore be, for example, ethanolamine.

The optionally substituted $C_{1-20}$ cycloalkyl may refer to a $C_{1-20}$ cycloalkyl which may be unsubstituted or substituted with 1 to 5 hydroxy moieties. When $R_4$ is a hydroxylated $C_{1-20}$ cycloalkyl, $R_3$ may therefore be, for example, inositol.

When $R_4$ is an amino acid, the amino acid may be linked to the oxygen pendant on $R_3$ with an oxygen derived from the side chain of the amino acid. This oxygen may be, for example, a hydroxyl moiety pendant on the side chain of the amino acid. Such amino acids may be, for example, serine, threonine or tyrosine. When $R_4$ is an amino acid, $R_3$ may therefore be, for example, serine.

A "long-chain phospholipid" and a "short-chain phospholipid" may be used, in the first instance, as a relative term. It indicates that at least two types of phospholipids are used, wherein one phospholipid has a longer fatty acid moiety ($R_1$ and $R_2$ in Formula (I) above) than the other. The moieties $R_1$ and $R_2$ may be derived from unsaturated or saturated fatty acids. Hence, $R_1$ and $R_2$ may either comprise an alkyl chain or an alkylene chain. In the long-chain and the short-chain phospholipid, $R_1$ and $R_2$ may either be the same or different from each other. The long-chain phospholipid may be selected from a group comprising or consisting of 1,2-dioleoyl-sn-glycero-3-phosphocholine (DOPC), 1,2-dilauroyl-sn-glycero-3-phosphocholine (DLPC), 1,2-dimyristoyl-sn-glycero-3-phosphocholine (DMPC), 1,2-dipalmitoyl-sn-glycero-3-phosphocholine (DPPC), 1,2-distearoyl-sn-glycero-3-phosphocholine (DSPC), 1-palmitoyl-2-oleoyl-sn-glycero-3-phosphocholine (POPC), 1-palmitoyl-2-myristoyl-sn-glycero-3-phosphocholine (PMPC), 1-stearoyl-2-palmitoyl-sn-glycero-3-phosphocholine (SPPC) and 1,2-diarachidonoyl-sn-glycero-3-phosphocholine (DAPC), being preferably DOPC. In the same manner, the short-chain phospholipid used in the method may be selected from a group comprising or consisting of 1,2-dihexyanoyl-sn-glycero-3-phosphocholine ($DHPC_6$), 1,2-dipentanoyl-sn-glycero-3-phosphocholine, 1,2-diheptanoyl-sn-glycero-3-phosphocholine ($DHPC_7$), and 1,2-dioctanoyl-sn-glycero-3-phosphocholine, preferably being $DHPC_6$.

Advantageously, the critical micelle concentration (CMC) of the long-chain phospholipid may be different from the CMC of the short-chain phospholipid. Hence, in embodiments wherein the CMC of the two components is different from each other, for example if the long-chain phospholipid is DOPC and the short-chain phospholipid is $DHPC_6$, the critical micelle concentration of the two compounds is different and the optimal lipid concentration may be adjusted to effect bicellar formation at very low concentrations, depending on the individual CMC values.

The term "support" as used herein refers to any material which does not react with any of the phospholipids or the produced phospholipid bilayer. The support may include metals, transition metals or metalloids, either in their elemental form or as their oxides or nitrides. Hence, the support may include or may be selected from the group consisting of silicon oxide, gold, aluminum oxide, titanium oxide and silicon nitride. The surface of the support may be a substantially planar surface or the support may be in the form of nanoparticles or colloids. By using a support, a "solid-supported" phospholipid bilayer (SLB) may be obtained.

The long-chain phospholipid and the short-chain phospholipid in solution may form a bicellar mixture. This bicellar mixture may comprise "bicelles", which may be in the form of disk-like aggregates (as mentioned herein). The circular center of this "disk" may comprise the long-chain phospholipid while the edges of these discs may be stabilized by the short-chain phospholipids. In addition to the bicelles, the short-chain phospholipid may be present in the form of micelles. It is often observed that a too high concentration of the short-chain phospholipid may cause disruption of the formed SLB. This perturbation of the SLB may be due to the surfactant-like properties of the short-chain phospholipid. The disruption or perturbation of the SLB may also be called membrane-induced destabilization. The term "membrane" as used herein, may refer to the phospholipid bilayer before solidification (and transition into a solid-supported bilayer). Hence, the "membrane" is the lipid bilayer in a particular phase state. The term "membrane phase state" would be used for describing, for example, whether the lipid bilayer is in the fluid- or gel-phase state.

While a too high concentration of the short-chain phospholipid may be harmful to the membrane, as discussed above, on the other hand, a too low concentration of the short-chain phospholipid may not facilitate efficient SLB formation, or it would lead to very long reaction times, as the adsorption process on the substrate may be too slow. For this reason, the lowest limit of the concentration of the short-chain phospholipid may be about 0.0001 mM, which would roughly be equivalent to the time scale of a few hours for bilayer fabrication.

Advantageously, it has been found that the method as described above yields optimal phospholipid bilayers when the concentration of the phospholipids is relatively low. Hence, the concentration of the long-chain phospholipid in the solution obtained after the second step and which is to be deposited in the third step is at most 0.1 mg/mL. The concentration of the long-chain phospholipid in the solution of the first step may be higher and may be diluted after the blending of the second step in order to be as low as at most 0.1 mg/mL. The concentration of the long-chain phospholipid is in relation with the short-chain phospholipid, which is, in turn, very low as well. Hence, at this low concentration range, the free concentration of the short-chain phospholipid is sufficiently low to prevent membrane-induced destabilization, resulting in high-quality SLBs via bicelle adsorption and spontaneous rupture after reaching a critical surface coverage. At the same time, the presence of the short-chain phospholipid is important for membrane softening and the disk-like bicellar aggregates exhibit greater deformation in the adsorbed state than conventional vesicles.

In various embodiments, the long-chain phospholipid is a phospholipid comprising two fatty acid residues, wherein each of the fatty acid residues has more than 10 carbon atoms, preferably more than 12 carbon atoms, more preferably more than 16 carbon atoms. Hence, in these embodiments, $R_1$ and $R_2$ in Formula (I) above may each individually have an alkyl chain wherein the number of carbon atoms is more than 10 carbon atoms, preferably more than 12 carbon atoms, more preferably more than 16 carbon atoms. The number of carbon atoms may also be in the range of 12 to 24 carbon atoms, or 14 to 22 carbon atoms, or 16 to 20 carbon atoms, or 14 to 18 carbon atoms, preferably 16 to 18 carbon atoms.

In various embodiments, the long-chain phospholipid and/or the short-chain phospholipid may be a phosphatidylcholine. A "phosphatidylcholine" refers to a phospholipid wherein the hydrophilic portion ($R_3$ in Formula (I)) comprises a choline moiety. The structure of a phosphatidylcholine may then be represented by the structure of Formula (II) below:

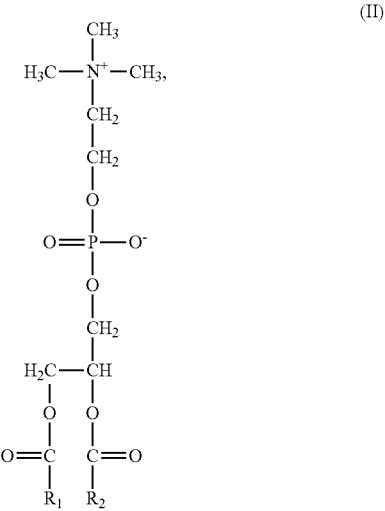

wherein $R_1$ and $R_2$ are as discussed above.

In various embodiments, the long-chain phospholipid has a gel-to-fluid-phase transition temperature of below 0° C., preferably of below −10° C. The "gel-to-fluid-phase transition temperature" ($T_m$) as used herein may refer to the temperature required to induce a change in the lipid physical state from the ordered gel phase, where the hydrocarbon chains are fully extended and closely packed, to the disordered liquid phase, where the hydrocarbon chains are randomly oriented and fluid. Advantageously, by having a gel-to-fluid-phase transition temperature of below 0° C., this may ensure fluid-phase membrane states at room temperature and this stable existence in the fluid-phase is important because fluid-phase membranes permit dynamic structural rearrangements and SLB formation can become inhibited at or near the $T_m$ of a phospholipid. Furthermore, when bicellar mixtures are considerably above their transition temperature, they may form fluid-phase membranes in which some short-chain phospholipids are in fast exchange with long-chain phospholipids, and this exchange may cause membrane softening that decreases the bending moduli of membranes.

In various embodiments, the short-chain phospholipid may be a phospholipid comprising two fatty acid residues $R_1$ and $R_2$, as shown in Formula (I) above. Hence, they may each have an alkyl chain wherein the number of carbon atoms is at most 10 carbon atoms, preferably at most 8 carbon atoms. The number of carbon atoms may also be in the range of 2 to 10 carbon atoms, or 4 to 10 carbon atoms, or 4 to 8 carbon atoms, preferably 4 to 6 carbon atoms. In one example, the short-chain phospholipid is $DHPC_6$.

In various embodiments, at least one of the long-chain phospholipid and the short-chain phospholipid may comprise an unsaturated fatty acid residue. Hence, the alkyl chain depicted as $R_1$ and $R_2$ may comprise at least one double bond. Advantageously, by comprising an unsaturated fatty acid residue as opposed to a saturated fatty acid residue, the gel-to-fluid-phase transition temperature may be lowered, therefore resulting in the advantages as explained above.

In various embodiments, the long-chain phospholipid may comprise an unsaturated fatty acid residue. In one example, the long-chain phospholipid is DOPC.

In one specific example, the long-chain phospholipid is DOPC and the short-chain phospholipid is $DHPC_6$.

In various embodiments, the concentration of the long-chain phospholipid is at most 0.05 mg/mL, preferably at most 0.025 mg/mL. As mentioned above, one of the advantages of the presently disclosed method is using a relatively low concentration of phospholipids in the solution in the third step. The low concentration of the long-chain phospholipid is in relation with a low concentration of the short-chain phospholipid.

Hence, in various embodiments, the long-chain phospholipid and the short-chain phospholipid are provided in a molar ratio of about 1:0.02 to about 1:5, preferably in a ratio of about 1:0.04 to about 1:3. In specific embodiments, the ratio may be about 1:0.2 to about 1:2.6.

A ratio as described above may result, according to various embodiments referring to the first step, in the solution comprising a bicellar mixture, as described above, wherein the bicellar mixture comprises bicelles of the long-chain phospholipid and the short-chain phospholipid.

The formation of bicellar mixtures may be dependent on the environment. Hence, in various embodiments, the solvent utilized to make the solution may be a water-based buffer solution, preferably a water-based buffer solution with an effective pH range of between 7 and 10, more preferably between 7.5 and 9.0. In one example, the water-based buffer solution is an aqueous solution comprising Tris (tris(hydroxymethyl)aminomethane) and sodium chloride and the pH value of this buffer solution may be about 7.5.

As mentioned above, the support may comprise or consist of an inorganic material. The inorganic material may be selected from various inorganic materials comprising metals, transition metals, and metalloids. The term 'transition metal' is to be interpreted broadly to include any element in which the filling of the outermost shell to eight electrons within a periodic table is interrupted to bring the penultimate shell from 8 to 18 or 32 electrons. Transition elements may include, without limitation, scandium, titanium, vanadium, chromium, manganese, iron, cobalt, nickel, copper, zinc, ytterbium, zirconium, niobium, molybdenum, silver, lanthanum, hafnium, tantalum, tungsten, rhenium, rare-earth elements, cerium, praseodymium, neodymium, promethium, samarium, europium, gadolinium, terbium, dysprosium, holmium, erbium, thulium, yttrium, lutetium, and rhodium. Included in this definition are post-transition metals, which may refer to the metallic elements in the periodic table located between the transition metals (to their left) and the metalloids (to their right). These elements may include gallium, indium, thallium, tin, lead, bismuth, cadmium, mercury and aluminum. The metalloids may include boron, silicon, germanium, arsenic, antimony, tellurium, polonium and astatine. The metals, transition metals and metalloids may either be elemental or in form of their salts, for example, as the oxide, nitride, sulfate and phosphate.

In various embodiments, the surface of the support may be substantially planar. The term "substantially planar" may refer to the surface representing one plane, which is substantially linear. The SLB may then be immobilized on an inorganic solid support.

In alternative embodiments, the surface of the support may be nanostructured. In specific embodiments, the nanostructured surface may be in the form of colloids or nanoparticles. The SLB would then provide a coating on the inorganic colloids or nanoparticles. Advantageously, by coating an SLB on nanoparticles, for example on oxide or nitride inorganic support materials, the SLB may be further functionalized to be used in electronic and biomedical applications.

In the "freeze-thaw-vortex" process in the second step, the temperature of the solution may be decreased. In various embodiments, the temperature of the solution may be decreased, optionally from room temperature, to below 0° C., or to below −5° C., or to below −10° C., or to below −50° C., preferably to below −100° C., more preferably to below −150° C. In one example, the temperature of the solution may be decreased to the temperature of liquid nitrogen (−195.79° C.). The term "room temperature" as used herein, also called "ambient temperature", refers to a temperature which may be between 15° C. and 25° C., or between 18° C. and 22° C.

In the "freeze-thaw-vortex" process in the second step, and after the cooling step described before, the temperature of the solution may be increased. In various embodiments, the temperature of the solution may be increased to above room temperature, or to above 30° C., or to above 40° C., more preferably to above 50° C. In one example, the temperature of the solution may be increased to 60° C.

As mentioned before, the solution may be blended in the second step. While any blending method may be used, in preferred embodiments, the blending may be undertaken by vortexing the solution. In various embodiments, the "freeze-thaw-vortex" process, as described above as the second step, may be repeated. Hence, the second step may be repeated for about at least 2, or 3, preferably for about 4 times or more.

After the "freeze-thaw-vortex" process, as described above as, the second step may optionally comprise a dilution step. In this step, the solution obtained after the blending of the "freeze-thaw-vortex" process carried out in the second step may be diluted in order to obtain the concentration of the long-chain phospholipid in the solution being at most 0.1 mg/mL. In the event the "freeze-thaw-vortex" process is repeated, the dilution would only be carried out after the last blending step of the "freeze-thaw-vortex" process.

The process comprises a third step. In the third step, the solution obtained after the second step is deposited on a surface of a support, wherein the concentration of the long-chain phospholipid in the solution is at most 0.1 mg/mL, for obtaining a solid-supported phospholipid bilayer. According to various embodiments, in the third step of the method, the bicellar mixture may rupture in order to obtain the solid-supported phospholipid bilayer. The rupturing may be a result of reaching a critical bicelle concentration followed by adsorption on the substrate.

In various embodiments, the third step may be followed by a washing step. The washing step may comprise washing the obtained solid-supported phospholipid bilayer with a buffer solution.

Advantageously, the method as presented herein does not require the use of a surfactant.

Further advantageously, the method as presented herein does not require the use of vesicles. Advantageously, this may avoid extensive sample preparation.

Further advantageously, the obtained solid-supported phospholipid bilayer may be a planar phospholipid layer on the support.

In a second aspect, a solid-supported phospholipid bilayer is provided. The solid-supported phospholipid bilayer may be obtained by the method as described above.

Advantageously, the phospholipid bilayer may cover more than 90% of the surface of the support. The obtained phospholipid bilayer may have a thickness of about 2 to about 7 nanometers. In preferred embodiments, the obtained phospholipid bilayer may have a thickness of about 3 to about 6 nanometers.

In some embodiments, the obtained phospholipid bilayer may comprise or consist of an SLB of $DHPC_6$ and DOPC. In alternative embodiments, the obtained phospholipid bilayer may comprise or consist of an SLB of substantially only DOPC. "Substantially", as used herein, may refer to a content of more than 90%, or more than 95%.

An important consideration in the present disclosure involves selecting the range of total lipid concentration. It was explored whether successful SLB formation is possible at lower phospholipid concentrations than reported in previous bicellar studies. In particular, by lowering the total phospholipid concentration, phospholipid aggregates in bulk solution as well as those adsorbed onto the surface would be mainly composed of DOPC phospholipids since $DHPC_6$ phospholipids would be preferentially in the monomeric state. Hence, it is necessary to find the optimal range whereby the bicellar mixture facilitates efficient SLB formation (i.e., $DHPC_6$ concentration is sufficiently high to promote SLB formation) while minimizing deleterious effects of short-chain phospholipid detergents (i.e., keeping the $DHPC_6$ concentration below a critical concentration that causes membrane destabilization). Of note, since DOPC and $DHPC_6$ are in a mixed micelle system, the critical micelle concentration (CMC) of $DHPC_6$ is affected by the presence of DOPC and hence CMC values of $DHPC_6$ alone are insufficient to describe the system under investigation, especially with varying q-ratios, in the context of preventing surfactant-induced perturbations in SLB structure Important aspects of the present disclosure include the combination of the following:

- The presented method can form high-quality supported lipid bilayers in fully aqueous conditions.
- The presented method can form high-quality supported lipid bilayers with minimal sample preparation (no vesicles).
- The presented method can form high-quality supported lipid bilayers at very low lipid concentrations (4-10 times lower than other methods).

The inventors have identified optimal conditions for preparing SLBs by utilizing bicellar mixtures. While previous bicelle-related studies have used high phospholipid concentrations (between 0.25 and 0.8 mg/mL long-chain phospholipid) to prepare SLBs, the present findings reveal that SLB quality is optimal when using bicellar mixtures at appreciably lower concentrations of 0.024 mg/mL of the long-chain phospholipid or lower. In this concentration range, the free $DHPC_6$ concentration is sufficiently low to prevent membrane-induced destabilization, resulting in high-quality SLBs via bicelle adsorption and spontaneous rupture after reaching a critical surface coverage. At the same time, the presence of $DHPC_6$ in the bicellar mixture is important for membrane softening and the disk-like bicellar aggregates exhibit greater deformation in the adsorbed state than conventional vesicles. Furthermore, compared to vesicle preparation methods, bicelle preparation is simple and only requires freeze-thaw-vortex cycling, and the concentration range used to form high-quality SLBs is approximately 5 to 10-times lower than the minimum lipid concentration required for the SALB method (~0.1 mg/mL). The advantages over existing methods are illustrated in the below Table 1:

TABLE 1

| Method | Specialized Preparation | Phospholipid Concentration | Bilayer Quality |
| --- | --- | --- | --- |
| Vesicle Fusion | Yes | ~0.1 mg/mL or higher | 2 |
| SALB | No | 0.1-0.5 mg/mL | 3 |
| Conventional Bicelle | No | 0.25 mg/mL or higher | 4 |
| Invention | No | 0.08 mg/mL or lower | 1 |

Ranking: 1 is best combination of completeness, free of defects, and reproducibility. 4 is worst.

Hereinafter, the present disclosure will be described more fully with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, lengths and sizes of layers and regions may be exaggerated for clarity.

EXPERIMENTAL SECTION

Materials and Methods

Example 1: Preparation of DOPC/$DHPC_6$ Bicellar Mixtures 1,2-dioleoyl-sn-glycero-3-phosphocholine (DOPC) and 1,2-dihexyanoyl-sn-glycero-3-phosphocholine (DHPC) were purchased from Avanti Polar Lipids (Alabaster, Ala.). In the context of the description, whenever "DHPC" in this Examples section is stated, it refers to $DHPC_6$ (1,2-dihexyanoyl-sn-glycero-3-phosphocholine). DOPC dissolved in chloroform was dried with a gentle stream of nitrogen and evaporated in a vacuum desiccator overnight. The DOPC film was hydrated with a buffer solution (10 mM Tris, 150 mM NaCl, pH 7.5) that contained the appropriate DHPC concentration to make 1 mL of 1 mM DOPC stock solutions for different q-ratios (as defined by [DOPC]/[DHPC]). Subsequently, the sample was plunged into liquid nitrogen for 1 minute, followed by a 5-minute incubation period in a 60° C. water bath and vortexing for 30 seconds. This freeze-thaw-vortex cycle was repeated 5 times unless otherwise noted. The final bicellar mixture was optically clear at room temperature. Before experiment, the stock solution was diluted in buffer (10 mM Tris, 150 mM NaCl, pH 7.5) to the desired final lipid concentration.

Example 2: Quartz Crystal Microbalance-Dissipation (QCM-D) Experiments

QCM-D experiments were conducted with a Q-Sense E4 instrument (Biolin Scientific AB, Stockholm, Sweden) in order to monitor the SLB formation process. The QCM-D is a label-free measurement technique that is sensitive to the mass and viscoelastic properties of an adsorbate on the surface by measuring changes in the resonance frequency and energy dissipation of an oscillating, piezoelectric quartz crystal sensor chip. The sensor chip had a fundamental frequency of 5 MHz and a sputter-coated, 50-nm-thick layer of silicon dioxide (model no. QSX 303, Biolin Scientific AB). Before the experiment, the sensor chips were thoroughly rinsed with ethanol, dried with nitrogen gas, and treated with oxygen plasma for 1 minute. In the experiment, a baseline signal with aqueous buffer solution (10 mM Tris, 150 mM NaCl, pH 7.5) was established shortly before injection of the bicellar mixture under continuous flow conditions. Following SLB formation, 50 µM of bovine serum albumin was added under continuous flow conditions for 10 minutes in order to quantify the degree of bilayer completeness. Throughout the experiment, liquid samples were injected at 50 µL/minute by using a peristaltic pump (Reglo Digital, Ismatec, Glattbrugg, Switzerland). The temperature was maintained at 25.0±0.5° C. The experiments were recorded at odd-numbered overtones ranging from the $3^{rd}$ to 11th odd overtone by using the Q-Soft software package (Biolin Scientific AB), with the presented data recorded at the $5^{th}$ odd overtone. Data processing and analysis were completed using the QTools (Biolin Scientific AB) and OriginPro 8.5 (OriginLab, Northampton, Mass.) software packages.

Example 3: Fluorescence Microscopy Experiments

Epifluorescence microscopy was performed to directly observe the SLB formation process. For these experiments, the long-chain phospholipid composition included a mixture of 99.5 mol % DOPC and fluorescently labeled 0.5 mol % 1,2-dipalmitoyl-sn-glycero-3-phosphoethanolamine-N-(lissamine rhodamine B sulfonyl) lipid. An Eclipse TI-U inverted optical microscope (Nikon, Japan) with a 60× magnification (NA=1.49) oil-immersion objective lens (Nikon) was used, and images were recorded with an iXon 512 pixel×512 pixel EMCCD camera (Andor Technology, Northern Ireland). The pixel size was 0.267×0.267 µm². A fiber-coupled mercury lamp (Intensilight C-HGFIE, Nikon) was used to illuminate the fluorophores with a TRITC filter. SLBs were formed inside a microfluidic flow-through chamber (sticky slide VI 0.4, Ibidi, Germany) through the injection of a bicellar mixture under continuous flow conditions at 40 µL/minute. After formation, the lipid bilayer was rinsed with buffer solution (10 mM Tris, 150 mM NaCl, pH 7.5). The process of SLB formation, followed by buffer rinsing, was captured through time-lapsed image recording every 5 seconds. The initial time, t=0 s, was defined by when the bicellar mixture reached the channel inlets. For each measurement recorded, the fluorescence intensity of each image was normalized using a custom-written script for the Python(x,y) 2.7.5 software program.

Example 4: Fluorescence Recovery after Photobleaching (FRAP)

FRAP measurements were conducted by a 5-second photobleaching of a circular spot of 20 µm diameter within fabricated SLBs by using a 532 nm, 100 mW laser (Klastech Laser Technologies, Dortmund). Subsequently, fluorescence micrographs were imaged for 120 s at 1 s intervals in order to calculate lateral diffusion coefficients using the Hankel transform method.

Results and Discussion

Example 5: Design Rationale

In general, bicellar mixtures are composed of a mixture of vesicles containing both long-chain and short-chain phospholipids, which are in dynamic equilibrium with micelles composed of the short-chain phospholipid. Past studies about utilizing bicellar mixtures to form SLBs have used either DMPC or DPPC as the long-chain phospholipid in the bicellar composition. Herein, it was decided to use the DOPC lipid instead and it is also capable of forming bicelles, as previously reported. While DMPC and DPPC have gel-to-fluid phase transition temperatures ($T_m$) of 23 and 41° C., respectively, DOPC has a lower $T_m$ of −20° C., which ensures fluid-phase membrane states at room temperature and this stable existence in the fluid-phase is important because fluid-phase membranes permit dynamic structural rearrangements and SLB formation can become inhibited at or near the $T_m$ of a phospholipid. Furthermore, when bicellar mixtures are considerably above their transition temperature, they form fluid-phase membranes in which some DHPC molecules are in fast exchange with long-chain phospholipids, and this exchange causes membrane softening that decreases the bending moduli of membranes.

Example 6: QCM-D Monitoring of Bicelle Adsorption onto Silicon Dioxide

To investigate SLB formation through the adsorption of bicellar mixtures composed of DOPC and DHPC phospholipids, the QCM-D technique was employed in order to monitor the bilayer formation process on silicon dioxide. The QCM-D technique is a label-free acoustic sensor that measures the mass and viscoelastic properties of a thin film adsorbed based on recording changes in resonance frequency and energy dissipation, respectively. It is commonly used for lipid adsorption studies, especially those involving vesicle adsorption and rupture leading to SLB formation, and can distinguish between different morphological states of adsorbed phospholipid molecules. The effects of total DOPC/DHPC lipid concentration on bicelle adsorption and SLB formation were tested at three different q-ratios: 0.05, 0.25, and 2.5, as described below.

Example 7: q-Ratio of 0.05

FIG. 1 shows the Δf and ΔD shifts for different total lipid concentrations at a fixed q-ratio of 0.05 (20-fold greater amount of DHPC than DOPC). The concentration is reported as the DOPC concentration while the effective q-ratio is fixed (proportional change in DHPC concentration as well). The arrows labeled 1 and 2 correspond to bicelle injection and buffer washing steps, respectively, and both steps were performed under continuous flow conditions. At lipid concentrations of 0.13 mM DOPC and above, there was a rapid, initial increase in Δf to an inflection point around −38 to −47 Hz that was mirrored by an increase in ΔD up to $2.6 \times 10^{-6}$, indicating lipid adsorption on the surface (FIGS. 1A-C). The large increases in Δf and ΔD were quickly reversed, leading to values of ~−25 Hz and ~$0.6 \times 10^{-6}$, respectively, within a few minutes that suggest the inflection point corresponds to a critical coverage of adsorbed bicelles. These measurement values are in good agreement with expected values for a DOPC SLB, and the two-step adsorption kinetics resembled SLB formation via vesicle adsorption and rupture. However, SLB formation in this high phospholipid concentration range was hindered by a subsequent increase in Δf and ΔD values, with particularly large ΔD shifts up to around ~$5.5 \times 10^{-6}$ that increased according to the total lipid concentration and are suggestive of detergent-indicative morphological perturbations. Following a buffer washing step, the Δf values decreased to final values of ~−27.5 Hz while ΔD values declined to the range of 2 to $4 \times 10^{-6}$, which is significantly higher than the expected dissipation values for good-quality SLBs (~$0.5 \times 10^{-6}$ or lower).

Figure 2:
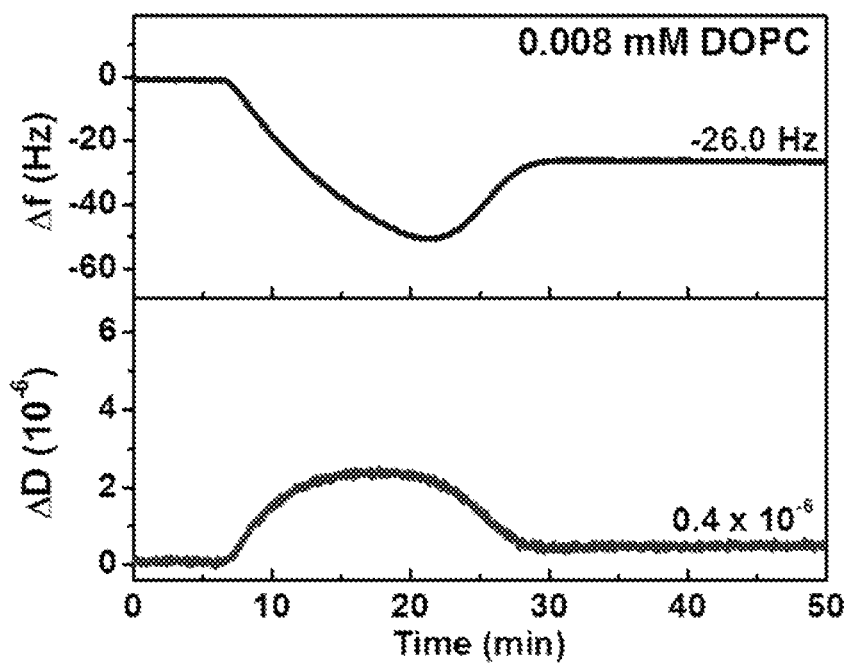
FIG. 2 shows a QCM-D measurement of SLB formation from a 0.008 mM DOPC bicellar mixture prepared at a q-ratio of 0.05. The bicellar mixture was added at approximately t=7 minutes.

By contrast, at lower lipid concentrations (0.063 mM DOPC and below), similar adsorption behavior was observed and there was a larger $\Delta f$ shift at the critical coverage (inflection point) (ca. −50 Hz) and $\Delta D$ shifts around ~2.5×10$^{-6}$ (FIGS. 1D-F). After reaching the critical coverage, the $\Delta f$ and $\Delta D$ signals again began to return to typical SLB values of $\Delta f$ and $\Delta D$ shifts around ~−25 Hz and ~0.3×10$^{-6}$, respectively. In this lower concentration regime, variations in the measurement time until reaching the critical coverage were more apparent and it was about 3 minutes post-addition at 0.063 mM DOPC, 5 minutes at 0.031 mM DOPC, and 10 minutes at 0.016 mM DOPC, suggesting that bicelle adsorption is diffusion-limited, as is the case for phospholipid vesicles and large proteins. In accordance with the total lipid concentration and the corresponding DHPC concentration, there were also additional measurement responses attributed to detergent-induced membrane destabilization, leading to final $\Delta f$ values around −24 to −28 Hz and $\Delta D$ values up to 2.1×10$^{-6}$. Unlike at higher total lipid concentrations, a subsequent buffer washing step did not change the measurement responses in this lower concentration regime. At 0.016 mM DOPC, the final $\Delta f$ and $\Delta D$ values were −24.5 Hz and 0.6×10$^{-6}$, respectively, which are within the expected range of SLBs. Nearly identical adsorption behavior with slower kinetics was also observed at 0.008 mM DOPC, and residual DHPC detergent did not appear to influence SLB formation in this case (FIG. 2). The final $\Delta f$ and $\Delta D$ values were −26.0 Hz and 0.4×10$^{-6}$, respectively. Hence, at a q-ratio of 0.05, we observed that using lower total lipid concentrations improves SLB quality, with optimal results obtained at around 0.016 mM DOPC and below.

For SLBs prepared under all tested conditions, 50 μM bovine serum albumin (BSA) was added after the buffer rinsing step in order to estimate the degree of SLB completeness across the sensor surface. While BSA adsorbs prodigiously onto silicon dioxide, there is known to be scant adsorption onto zwitterionic SLBs, and the difference in $\Delta f$ shifts can be used to estimate the percentage of completeness. Whereas BSA adsorption onto bare silicon dioxide substrate yielded $\Delta f$ shifts around −25 Hz, BSA adsorption onto SLB-coated silicon dioxide caused much smaller $\Delta f$ shifts of −1.6±0.2 Hz, indicating high (~94%) surface coverage of the SLBs on silicon dioxide.

Example 8: q-Ratio of 0.25

Figure 3:
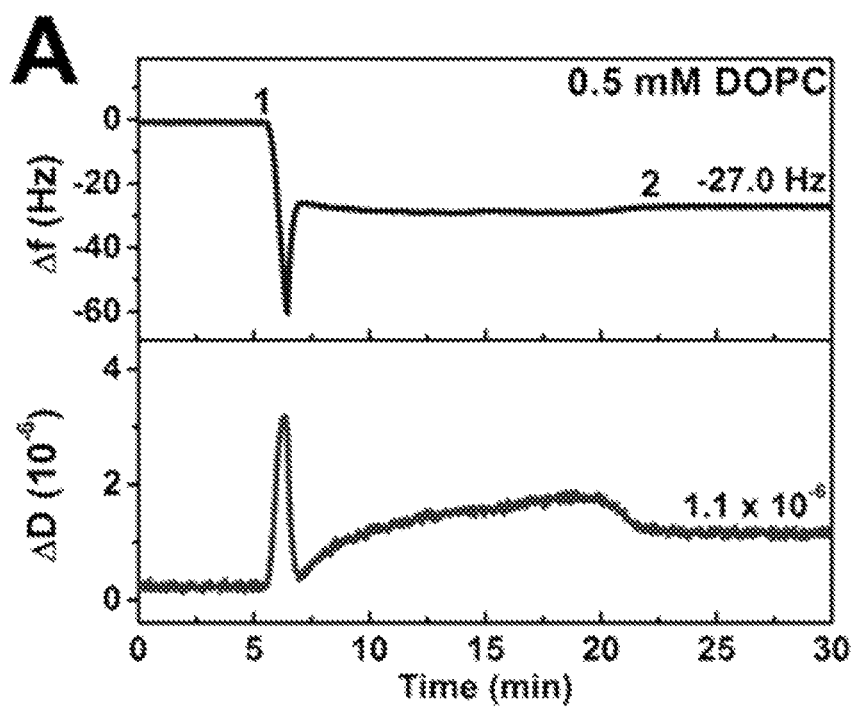
FIG. 3 shows a QCM-D measurement of SLB formation from bicellar mixtures prepared at a q-ratio of 0.25. $\Delta f$ (top line) and $\Delta D$ (bottom line) shifts as a function of time are presented for (A) 0.5 mM DOPC, (B) 0.25 mM DOPC, (C) 0.13 mM DOPC, (D) 0.063 mM DOPC, (E) 0.031 mM DOPC and (F) 0.016 mM DOPC. Bicellar mixtures were added at t=5 minutes (step 1), and a washing step was then performed.
Figure 3:
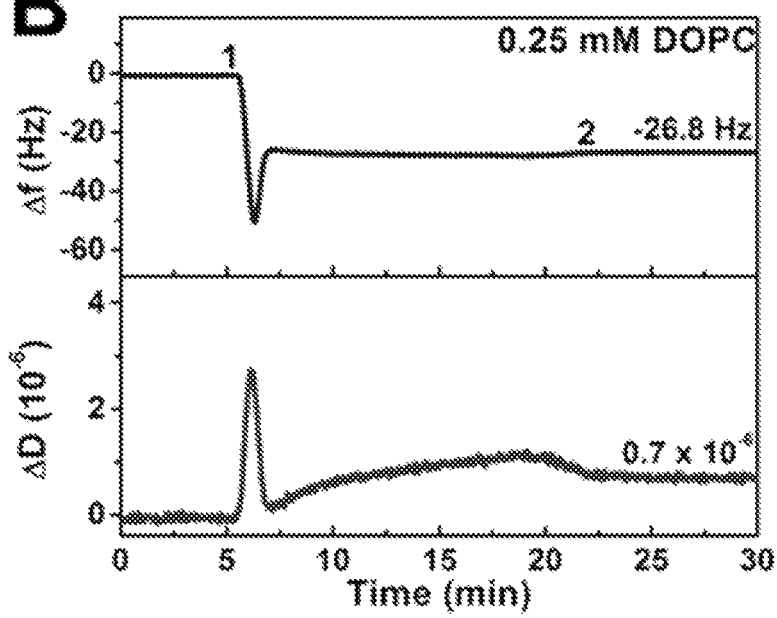
Figure 3:
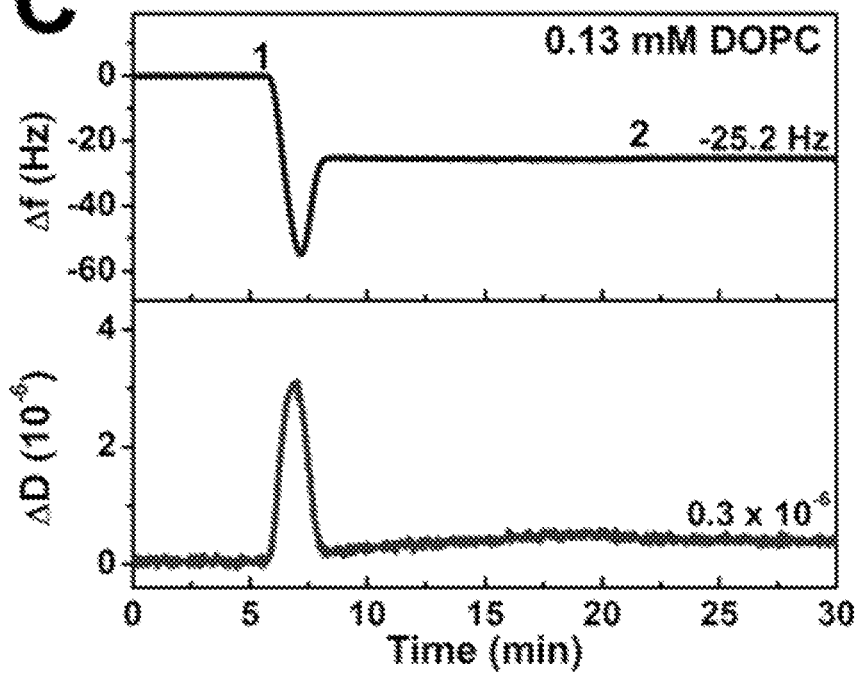
Figure 3:
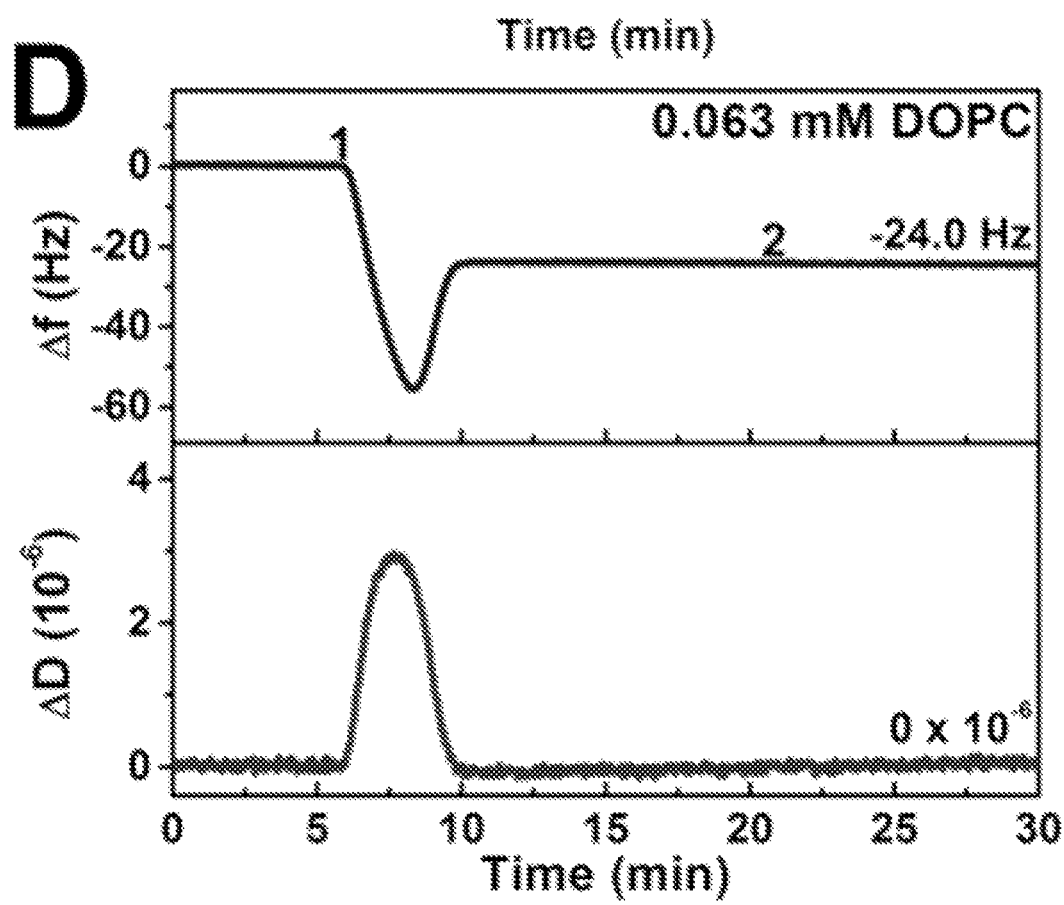
Figure 3:
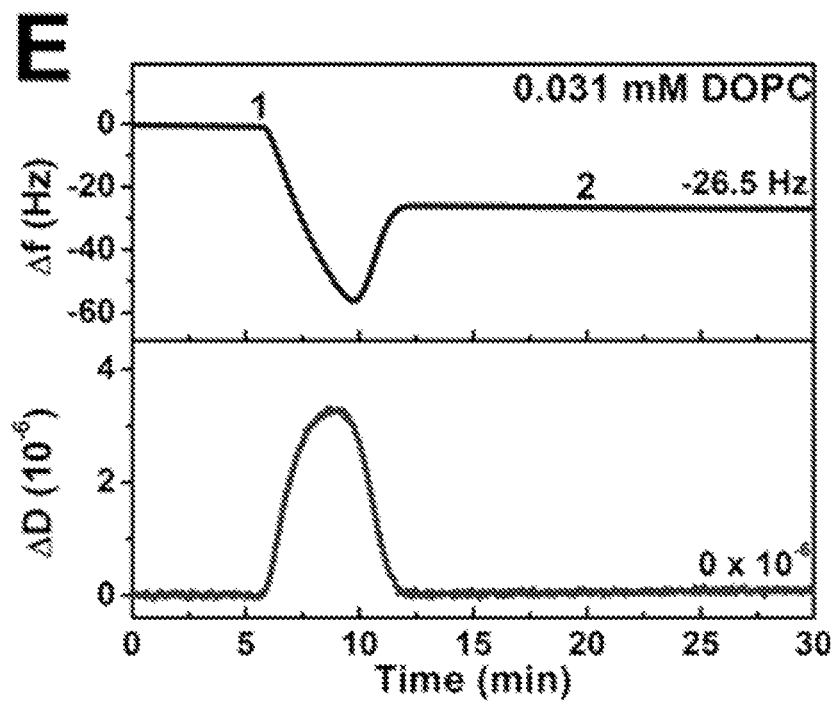
Figure 3:
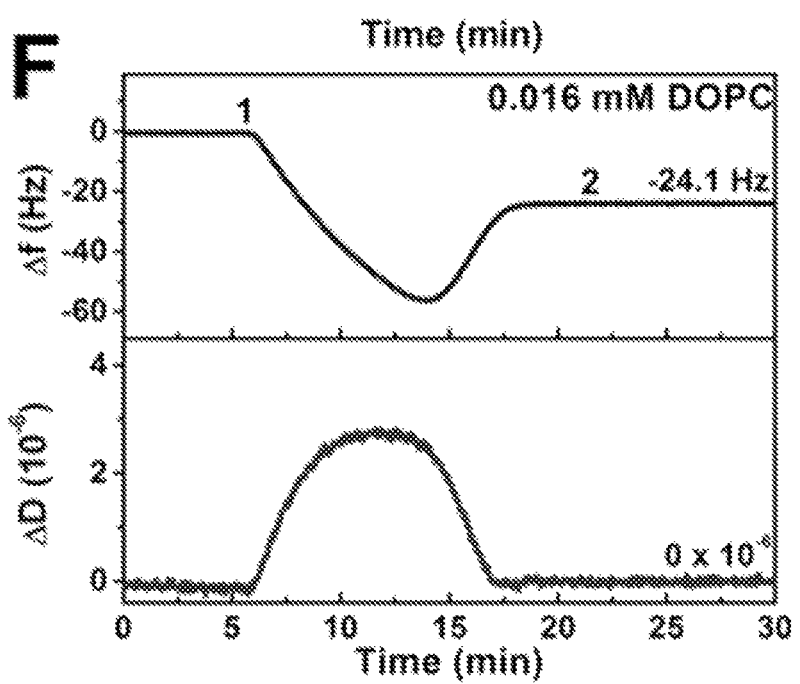

FIG. 3 shows the $\Delta f$ and $\Delta D$ shifts for different total lipid concentrations at a fixed q-ratio of 0.25 (4-fold greater amount of DHPC over DOPC). At all tested lipid concentrations, two-step adsorption kinetics indicative of a critical coverage leading to SLB formation were observed. Bicelle adsorption at the critical coverages corresponded to $\Delta f$ and $\Delta D$ shifts around −50-55 Hz and 3×10$^{-6}$, respectively, and the time scale again depended on the bulk lipid concentration. At 0.13 mM DOPC and above, similar adsorption kinetics were observed as described above, with SLB formation followed by moderate DHPC-induced membrane destabilization (FIGS. 3A-C). At 0.5 mM DOPC, the final $\Delta f$ and $\Delta D$ values were −27.0 Hz and 1.1×10$^{-6}$, respectively, whereas the final $\Delta f$ and $\Delta D$ values were −25.2 Hz and 0.3×10$^{-6}$, respectively, when SLBs were prepared using 0.13 mM DOPC. The latter values are in excellent agreement with the anticipated values for an SLB, and indicate an upper bound concentration value for preparing SLBs with DOPC/DHPC bicelles at a q-ratio of 0.25.

By contrast, at lower DOPC concentrations of 0.063 mM and lower, the effect of residual DHPC on SLB quality was negligible and the $\Delta f$ and $\Delta D$ shifts were −24.8±0.7 Hz and 0×10$^{-6}$, respectively (FIGS. 3D-F). These values are indicative of high-quality SLBs and further BSA adsorption studies indicate that the fabricated SLBs have greater than 94% completeness. Of note, the $\Delta f$ shifts at the critical coverage for phospholipid adsorption at a q-ratio of 0.25 were larger than the corresponding $\Delta f$ shifts for bicelles at a q-ratio of 0.05 because the total lipid concentration at a given DOPC concentration is lower in the former case (e.g., for 1 mM DOPC, there is 20 and 4 mM DHPC for q-ratios of 0.05 and 0.25, respectively). This agrees with the expected trend of greater adsorption at lower total lipid concentrations even when the same concentration of long-chain phospholipid is present in the system, as previously reported for phospholipid-detergent mixtures.

Example 9: q Value of 2.5

Figure 4:
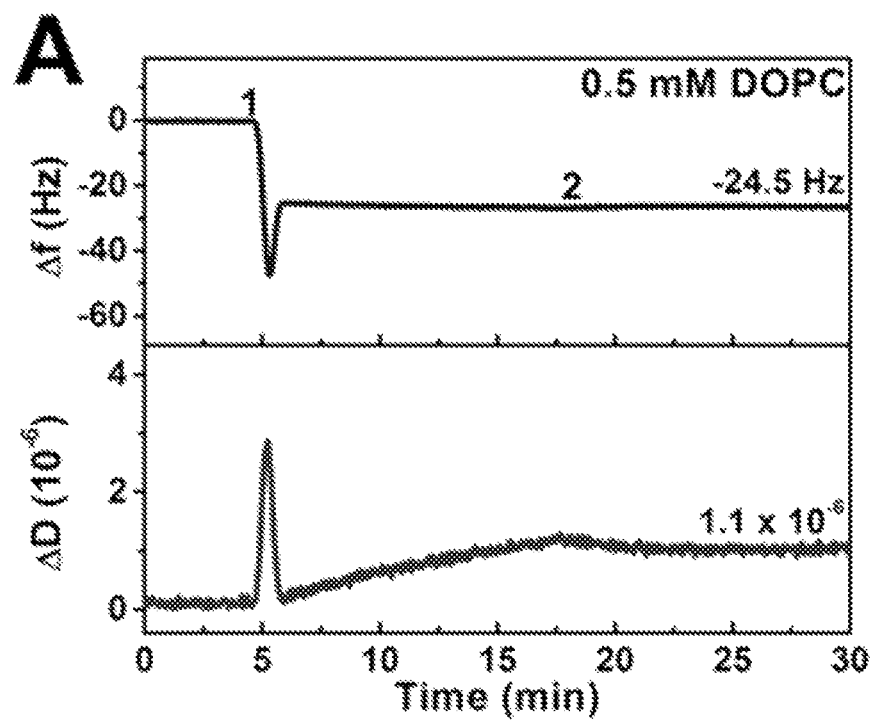
FIG. 4 shows a QCM-D measurement of SLB formation from bicellar mixtures prepared at a q-ratio of 2.5. $\Delta f$ (top line) and $\Delta D$ (bottom line) shifts as a function of time are presented for (A) 0.5 mM DOPC, (B) 0.25 mM DOPC, (C) 0.13 mM DOPC, (D) 0.063 mM DOPC, (E) 0.031 mM DOPC and (F) 0.016 mM DOPC. Bicellar mixtures were added at t=5 minutes (step 1), and a washing step was then performed.
Figure 4:
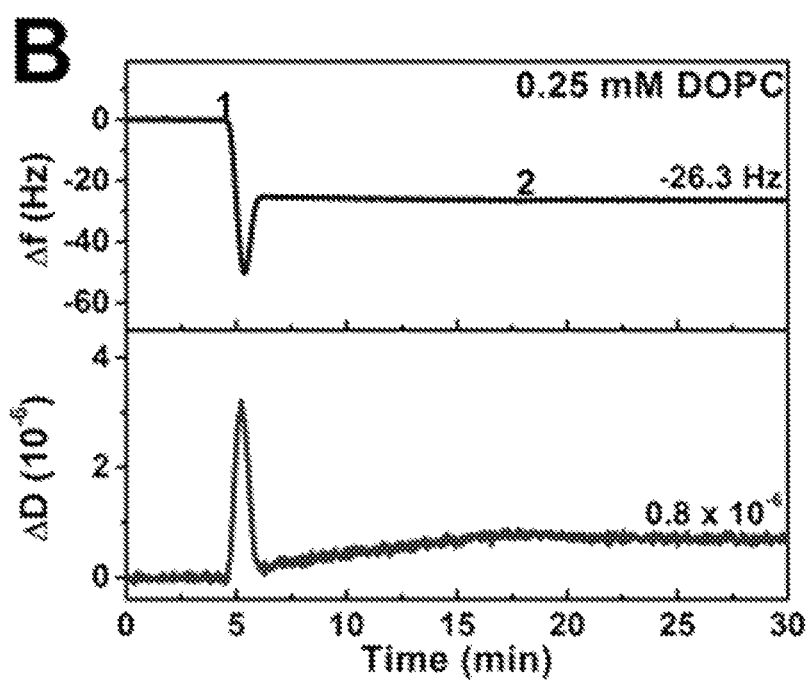
Figure 4:
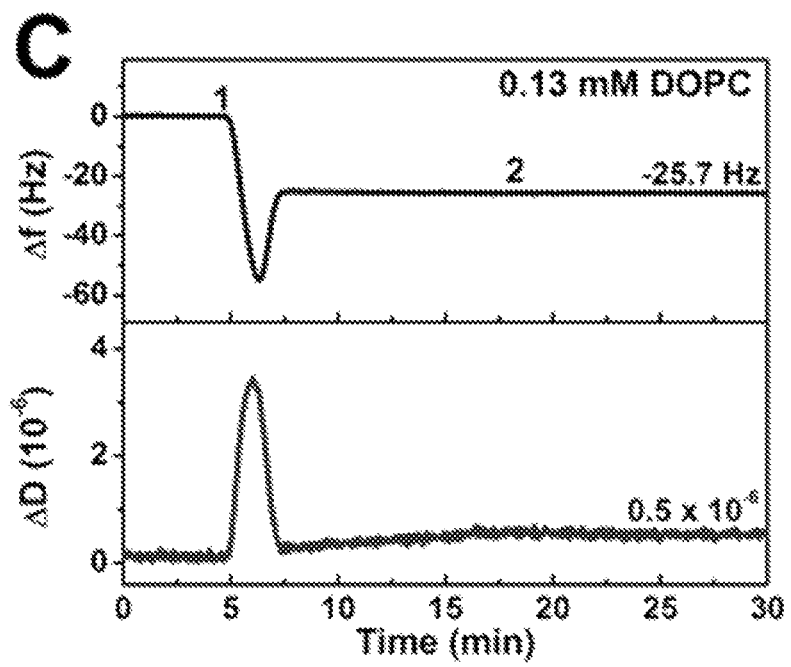
Figure 4:
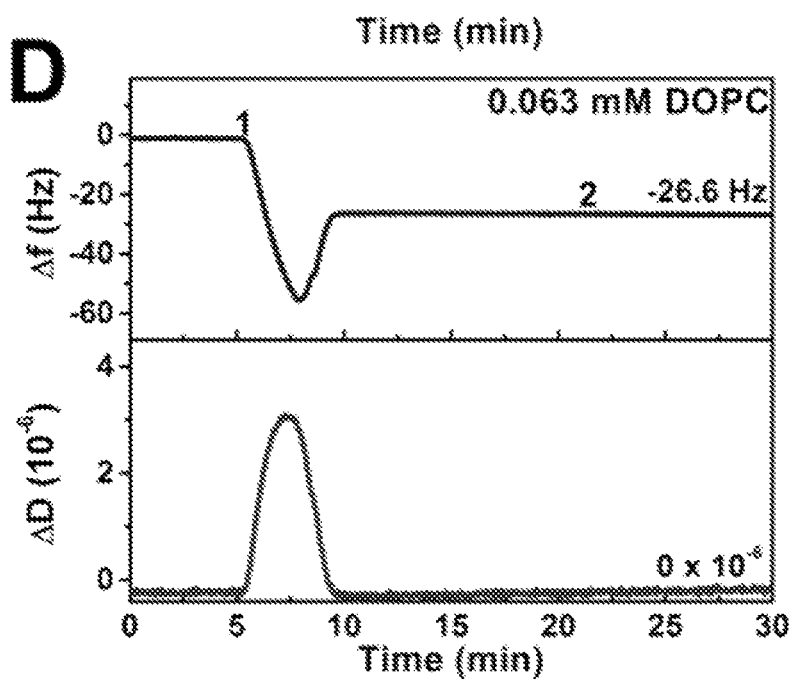
Figure 4:
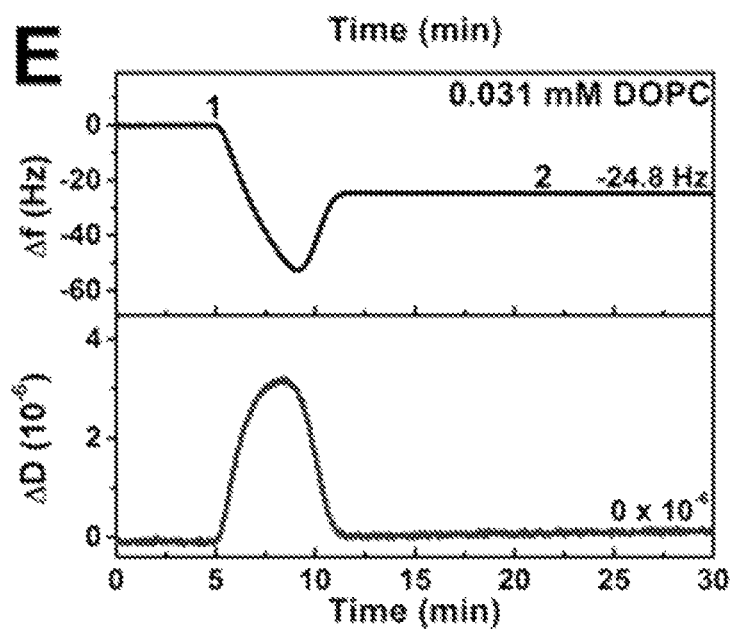
Figure 4:
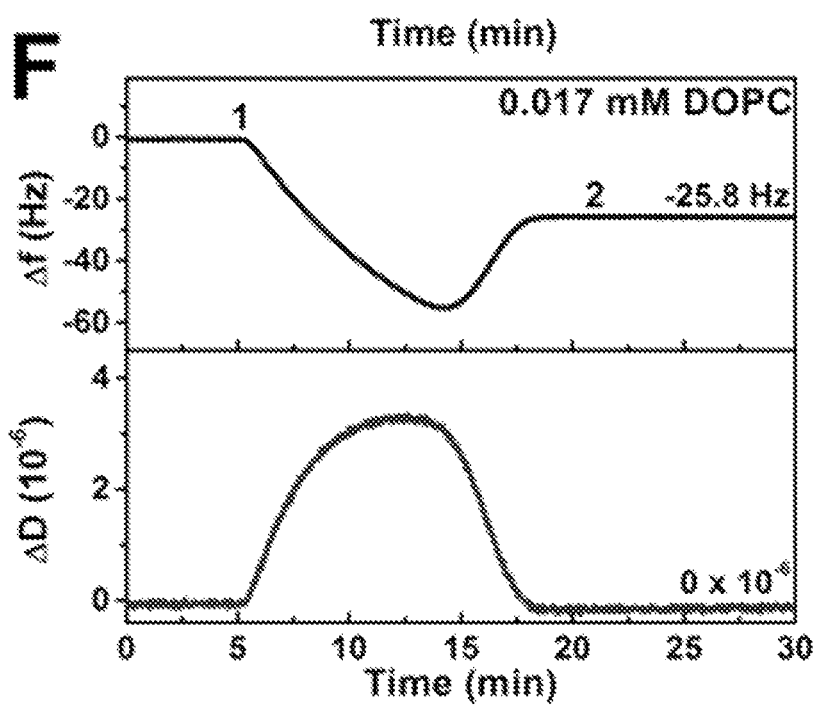

FIG. 4 shows the $\Delta f$ and $\Delta D$ shifts for different total lipid concentrations at a fixed q-ratio of 2.5 (2.5-fold greater amount of DOPC over DHPC). As described above for bicelles at other q-ratios, two-stage adsorption kinetics were observed in all cases. At DOPC lipid concentrations of 0.13 mM and above, the critical coverage corresponded to $\Delta f$ shifts ranging from −45 at 0.5 mM DOPC to −58 Hz at 0.13 mM DOPC (FIGS. 4A-C). Moderate DHPC-induced membrane destabilization was observed and the final $\Delta f$ and $\Delta D$ values ranged from −24.5 Hz and 1.1×10$^{-6}$, respectively, at 0.5 mM DOPC to −26.7 Hz and 0.5×10$^{-6}$, respectively, at 0.13 mM DOPC.

On the other hand, at lower DOPC concentrations of 0.063 mM and below, the final $\Delta f$ and $\Delta D$ values were −25.7±0.9 Hz and 0.0×10$^{-6}$, respectively (FIGS. 4D-F). Hence, like bicellar mixtures at a q-ratio of 0.25, the optimal concentration range for SLB formation for bicellar mixtures at a q-ratio of 2.5 appeared to be 0.063 mM DOPC and lower. BSA adsorption experiments confirmed that the SLBs are at least 94% complete in this case as well.

Figure 5:
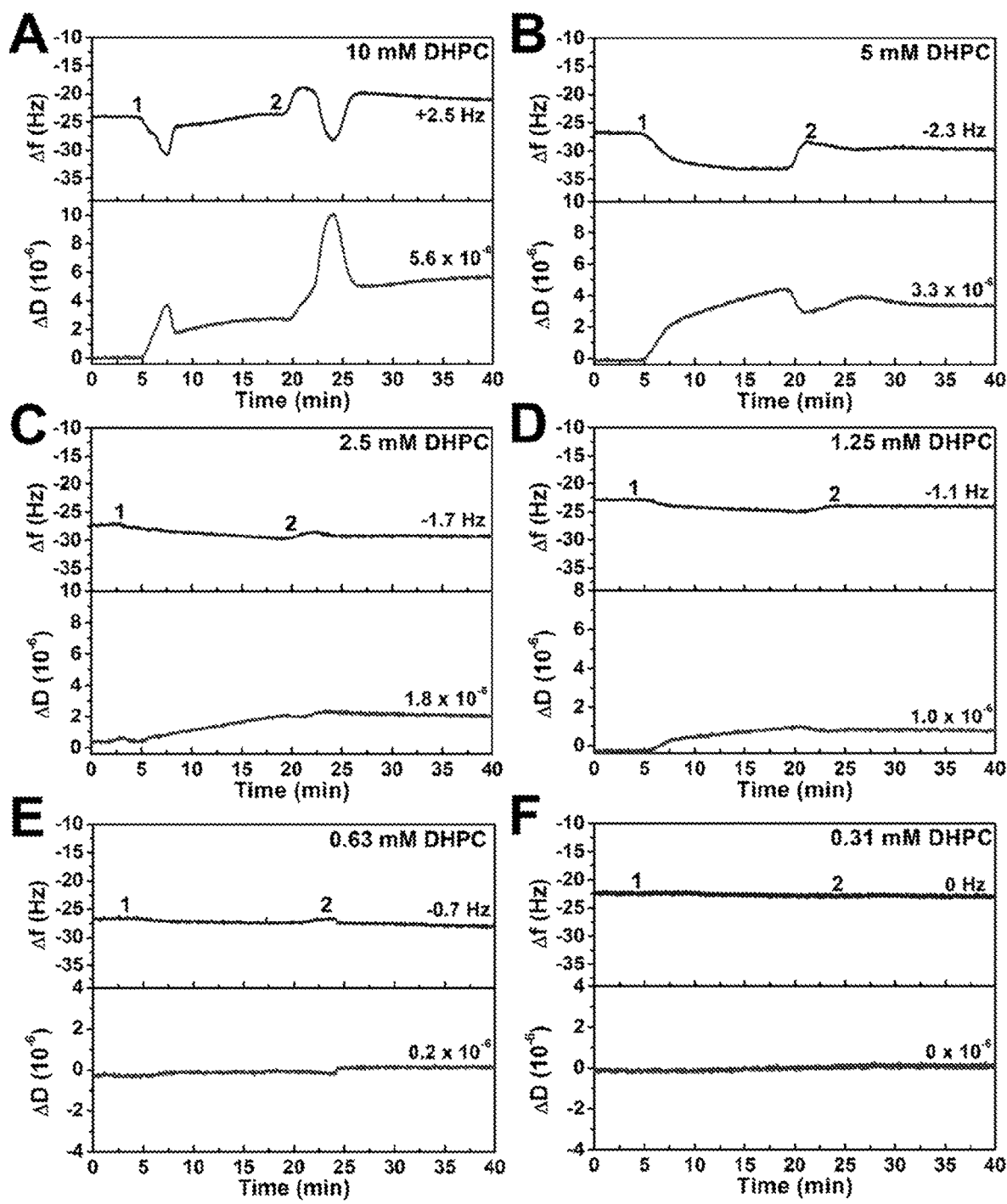
FIG. 5 shows the interaction of free DHPC molecules with pre-fabricated DOPC SLBs. $\Delta f$ (top line) and $\Delta D$ (bottom line) shifts as a function of time are presented for (A) 10 mM DHPC, (B) 5 mM DHPC, (C) 2.5 mM DHPC, (D) 1.25 mM DHPC, (E) 0.63 mM DHPC and (F) 0.31 mM DHPC. DHPC was added under continuous flow starting at t=5 minutes, and a washing step was then performed.
Figure 6:
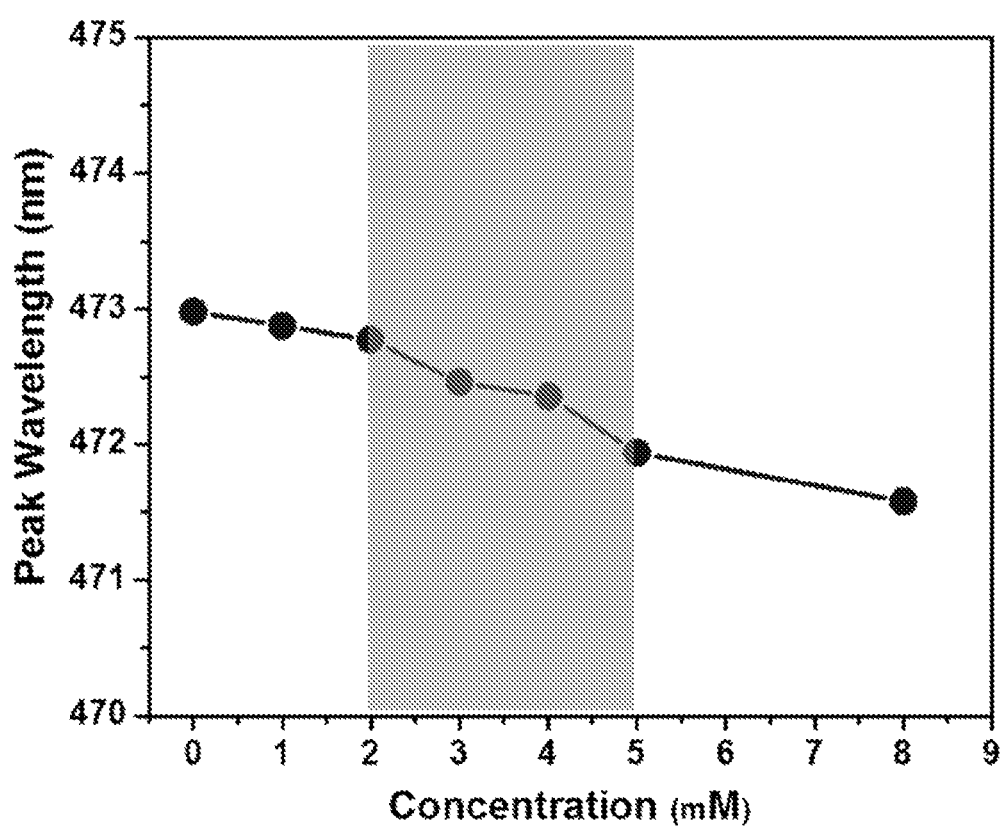
FIG. 6 shows an estimate of the DHPC critical micelle concentration (CMC) value using the 1-pyrenecarboxaldehyde fluorescence probe. Peak wavelength is shown as a function of compound concentration in Tris buffer [pH 7.5] with 150 mM NaCl solution. Each data point is the average of six technical replicates (n=6). A major drop in the peak wavelength occurs around 2-5 mM DHPC, which is the range of its estimated CMC value under these buffer conditions.
Figure 7:
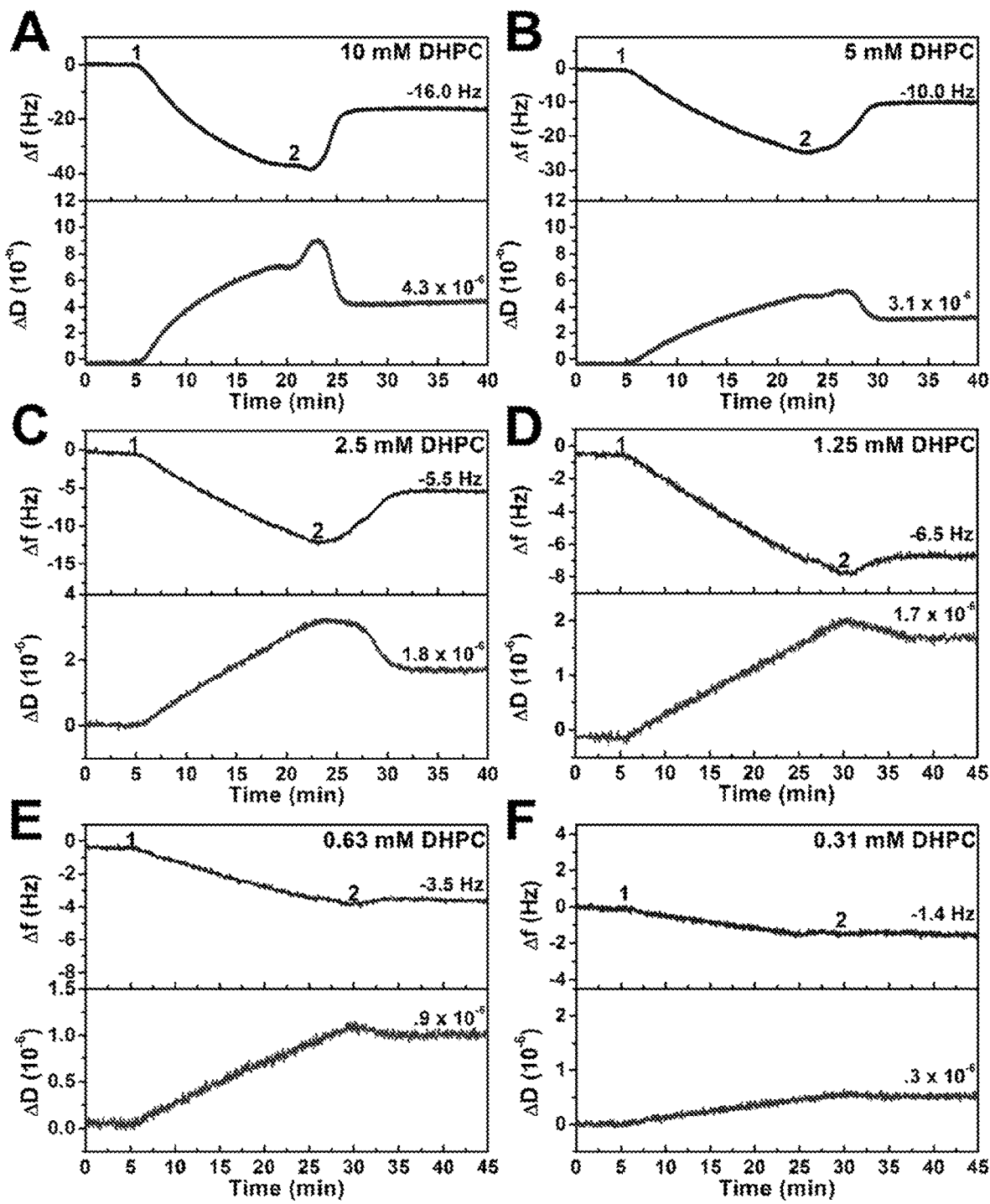
FIG. 7 shows the adsorption of free DHPC molecules onto a silicon dioxide surface. $\Delta f$ (top line) and $\Delta D$ (bottom line) shifts as a function of time are presented for (A) 10 mM DHPC, (B) 5 mM DHPC, (C) 2.5 mM DHPC, (D) 1.25 mM DHPC, (E) 0.63 mM DHPC and (F) 0.31 mM DHPC. DHPC was added under continuous flow starting at t=5 minutes (step 1), and a washing step was then performed.

To better understand the effect of DHPC on destabilizing fabricated SLBs, control experiments were conducted investigating the effect of adding DHPC molecules at various concentrations to preformed DOPCs prepared by the SALB method (FIG. 5). At 5 mM DHPC and higher concentrations, significant membrane destabilization was observed whereas appreciably smaller measurement responses were observed upon addition of 2.5 mM DHPC or lower concentrations. This suggests that the CMC value of DHPC alone in the buffer solution is around 2-5 mM, which agrees well with previous measurements that estimate the CMC value of DHPC to be around 20 mM in water and is supported by fluorescence spectroscopy experiments (FIG. 6). The lower estimated CMC observed in our case arises from salts in the buffer solution which reduce electrostatic repulsion among the short-chained, zwitterionic phospholipids and in turn permit micellar aggregation at lower concentrations. Importantly, no measurement shifts in response to DHPC addition to SLBs are observed at 0.31 mM DHPC and lower concentrations. Based on the recommended DOPC concentration ranges (0.063 mM DOPC) to prepare SLBs from bicelles at q-ratios of 0.25 and 2.5, this finding is in excellent agreement with the fact that the corresponding concentrations of DHPC in the bulk solution would be no greater than ~0.25 mM DHPC in such cases and further supported by recent findings of Saleem et al. that showed resulting SLBs have negligible DHPC components. Furthermore, DHPC adsorption onto bare silicon dioxide substrates is nearly negligible in this concentration range (FIG. 7). Hence, DOPC SLBs formed at lower total lipid concentrations from bicelles at q-ratios of 0.25 and 2.5 are most likely free of DHPC and have high structural integrity because the DHPC concentrations in the bulk solution are sufficiently low to not cause membrane destabilization.

Example 10: Evidence of a Critical Bicelle Concentration

Figure 8:
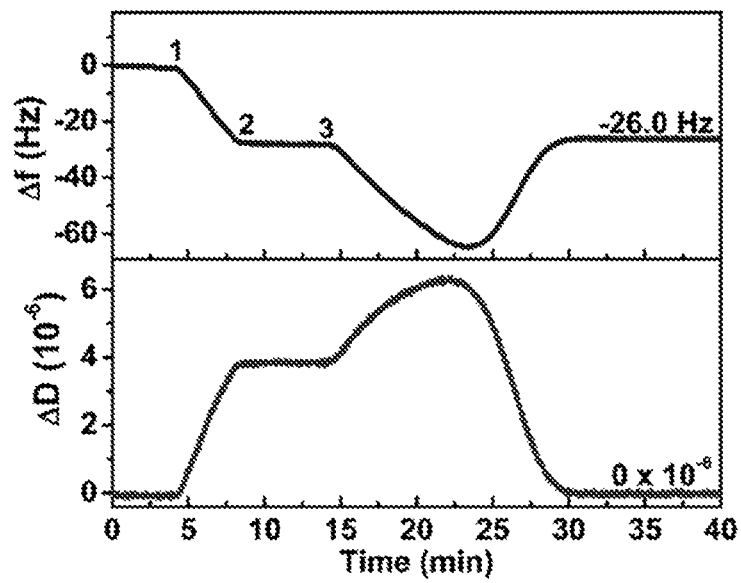
FIG. 8 shows a QCM-D measurement of SLB formation under stop-flow conditions. $\Delta f$ (top line) and $\Delta D$ (bottom line) shifts as a function of time are presented for a bicellar mixture prepared at a q-ratio of 2.5 and the experiment was conducted at a 0.031 mM DOPC lipid concentration. The bicellar mixture was added at approximately t=5 minutes (step 1), and the flowing solution was then exchanged with buffer solution (without bicelles) at t=10 minutes. The bicellar mixture was then reintroduced at t=15 minutes.

The aforementioned QCM-D experiments support that a critical coverage of adsorbed bicelles is necessary to induce SLB formation and that the process likely occurs via a membrane rupture mechanism that bears similarities to conventional vesicle adsorption and spontaneous rupture. To confirm that a critical coverage of adsorbed bicelles is necessary for SLB formation, we performed a stop-flow experiment in which bicelles were injected until reaching a surface coverage below the critical coverage and then the bicelle solution was exchanged with buffer solution (without bicelles). For this experiment, the bicelles had a q-ratio of 2.5 and a DOPC concentration of 0.031 mM. As presented in FIG. 8, the bicelles were added at around t=5 minutes and the $\Delta f$ shift decreased to around −30 Hz with a corresponding $\Delta D$ shift of $4 \times 10^{-6}$ before bicelle addition was stopped. At this point, the $\Delta f$ and $\Delta D$ values immediately changed with no subsequent measurement shifts until bicelles were again added at around t=15 minute. Upon the restart of bicelle addition, the $\Delta f$ shift further decreased to a critical coverage around −65 Hz with a corresponding $\Delta D$ shift of $6.6 \times 10^{-6}$. Afterwards, bicelle rupture occurred leading to SLB formation based on final $\Delta f$ and $\Delta D$ values of −26.0 Hz and $0 \times 10^{-6}$, respectively. This experimental finding reinforces that a critical coverage of adsorbed bicelles is necessary for SLB formation.

Figure 9:
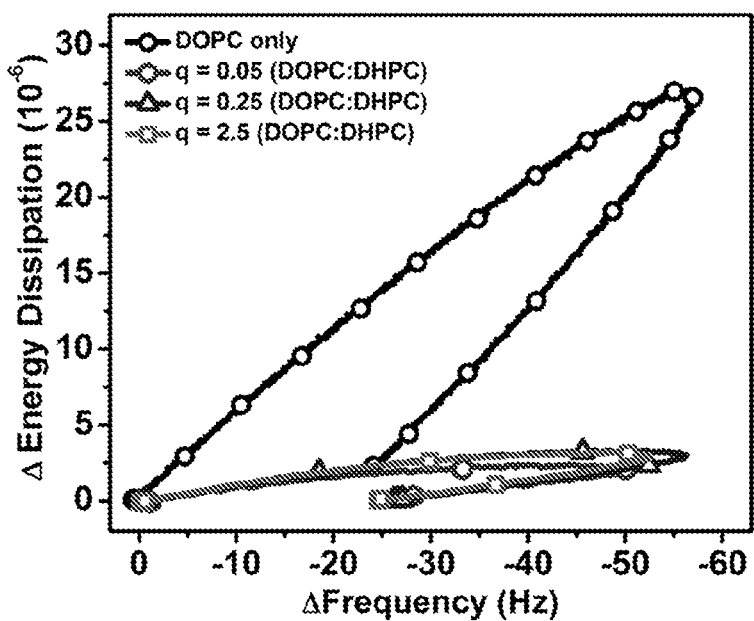
FIG. 9 shows a $\Delta f$-$\Delta D$ analysis of SLB formation on silicon dioxide from DOPC/DHPC bicellar mixtures. The bicelle adsorption process on silicon dioxide is presented as a function of the energy dissipation shift versus the frequency shift for bicellar mixtures prepared at different q-ratios. The control experiment contained the same preparation process for DOPC phospholipid vesicles only. The DOPC concentration was fixed at 0.063 mM.

Next, time-independent plots of energy dissipation shifts were constructed as a function of frequency shifts based on the QCM-D measurements tracking the SLB formation process from adsorbed bicelles at the various tested q-ratios (0.05, 0.25, 2.5:0.063 mM DOPC lipid concentration) as well as 0.063 mM DOPC lipid vesicles that were similarly processed with freeze-thaw treatment (FIG. 9). The $\Delta f$-$\Delta D$ plots are useful for analyzing structural transformations in the adsorbate properties independent of time. Following this approach, striking differences in the structural transformations of DOPC lipid vesicles versus DOPC/DHPC bicelles were observed. The adsorption profile for DOPC lipid vesicles had a much greater slope, indicating a larger viscoelastic contribution of adsorbed species relative to the adsorbate mass. For lipid vesicles, this large viscoelastic contribution is attributed to the high amount of coupled solvent inside the vesicles as well as hydrodynamically-coupled solvent between the adsorbed vesicles. By contrast, the adsorption profile of the DOPC/DHPC bicelles had an appreciably smaller slope, which supports that each adsorbed species has a smaller viscoelastic contribution, likely due to a smaller amount of coupled solvent. This finding is consistent with previous findings that detergent-like molecules such as DHPC can cause membrane softening on account of reduced membrane stiffness. As a result, the incorporation of short-chain phospholipids with a positive bending modulus into DOPC lipid membranes leads to an intermediate structure between spherical vesicles and mixed micelles. This behavior is consistent with the experimental findings and supports that DOPC/DHPC bicelles exhibit a similar adsorption profile to DOPC vesicles, although the geometrical configuration of the adsorbed phospholipid molecules is different and the corresponding viscoelastic contribution of adsorbed bicelles versus vesicles varies. Furthermore, the membrane softening would increase the deformation of adsorbed bicelles on the silicon dioxide surface and in turn decrease the corresponding viscoelastic contribution of adsorbed species. Hence, the inclusion of DHPC molecules facilitates SLB formation by inducing membrane softening which favors membrane rupture in the presence of attractive bicelle-substrate interactions.

Example 11: Direct Observation of Supported Lipid Bilayer Formation from Bicellar Mixtures In order to directly observe bicelle adsorption and rupture leading to SLB formation, time-lapsed fluorescence microscopy experiments were performed under continuous flow conditions on glass substrates using bicelles prepared at the different q-ratios. Specifically, the objective was to capture the bicelle rupture process when the critical bicelle concentration (CBC) is reached and the first micrograph in each series presented below corresponds to the time when fusion/rupture processes and ensuing SLB formation begin. On the basis of the previous QCM-D measurements, a specific DOPC concentration of 0.031 mM was chosen for further investigation based on the optimal conditions which yielded high-quality SLBs. The experimental results obtained for each q-ratio are described below and t=0 minutes is defined as the time point when bicelles first reached the measurement chamber.

Example 12: q-Ratio of 0.05

Figure 10:
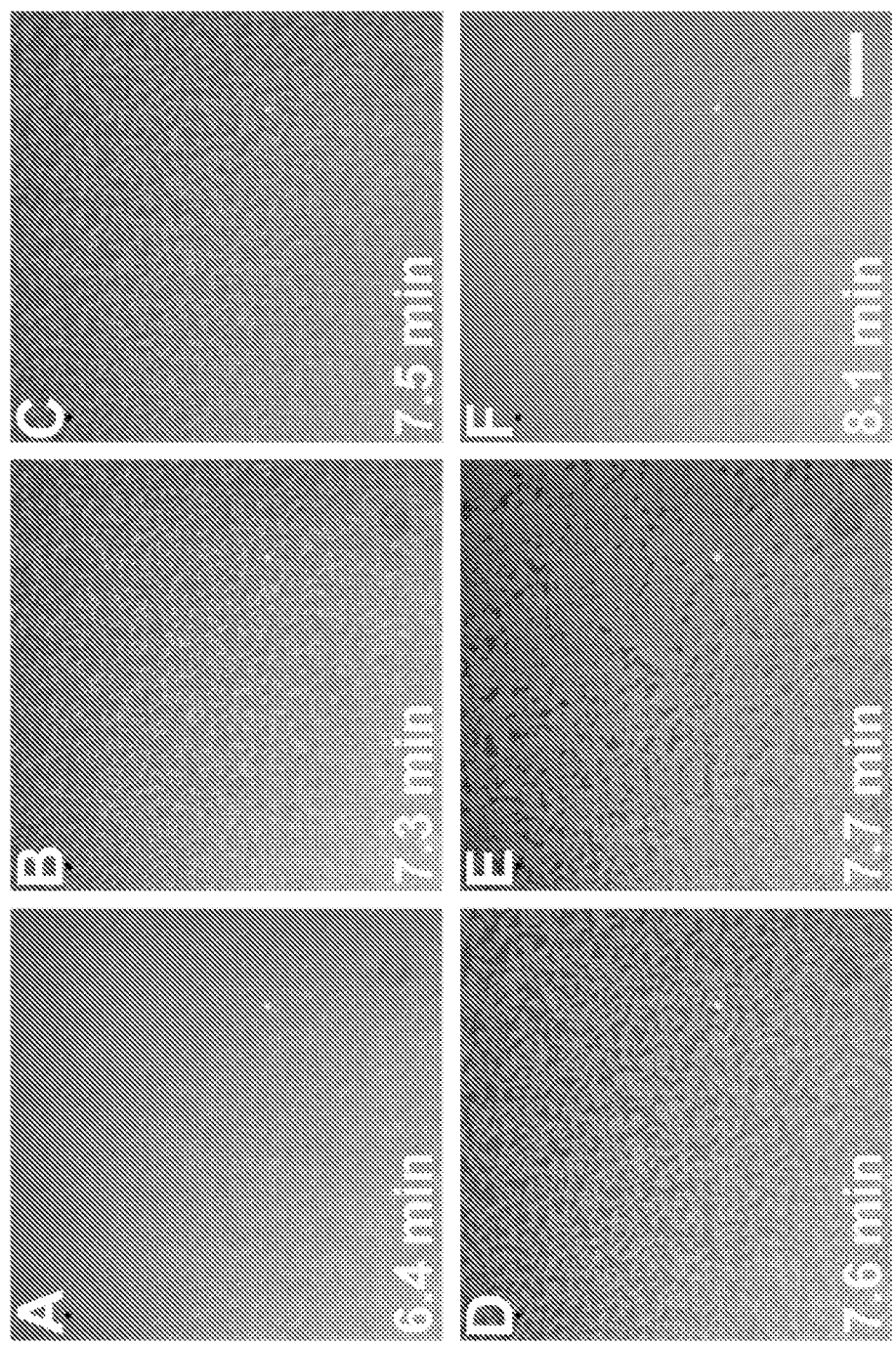
FIG. 10 shows a microscopic observation of SLB formation on a glass surface for a bicellar mixture prepared at a q-ratio of 0.05. (A-F) Image snapshots at various time points depict the rupture of absorbed bicelles as part of the SLB formation process. t=0 minutes corresponds to when bicelle addition was begun and t=6.4 minutes approximates when the CBC value was reached. The scale bar is 20 μm.

As shown in FIG. 10, the adsorption of fluorescently labeled bicelles onto the glass substrate is indicated by an increase in fluorescence intensity within the probing volume near the substrate and adsorption reaches a critical point after around 6.4 minutes (FIG. 10A). This time point corresponds to the critical bicelle concentration as the formation of small, bright spots soon begins indicating bicelle rupture and the formation of planar bilayer fragments (FIGS. 10B-C). While it took over 6 minutes for the surface coverage of adsorbed bicelles to reach the critical value, the resulting SLB formation process was rapid and took less than 2 minutes. The process continued as SLB formation propagated across the entire substrate, resulting in an SLB with uniform fluorescence intensity (FIGS. 10D-F). The observations support the interpretation of the QCM-D measurement results, and the kinetic stages bear similarities to the process of SLB formation via vesicle adsorption and rupture in which case the hydrophobic edges of bilayer fragments catalyze rupture processes in order to rapidly complete the SLB formation process.

Example 13: q-Ratio of 0.25

Figure 11:
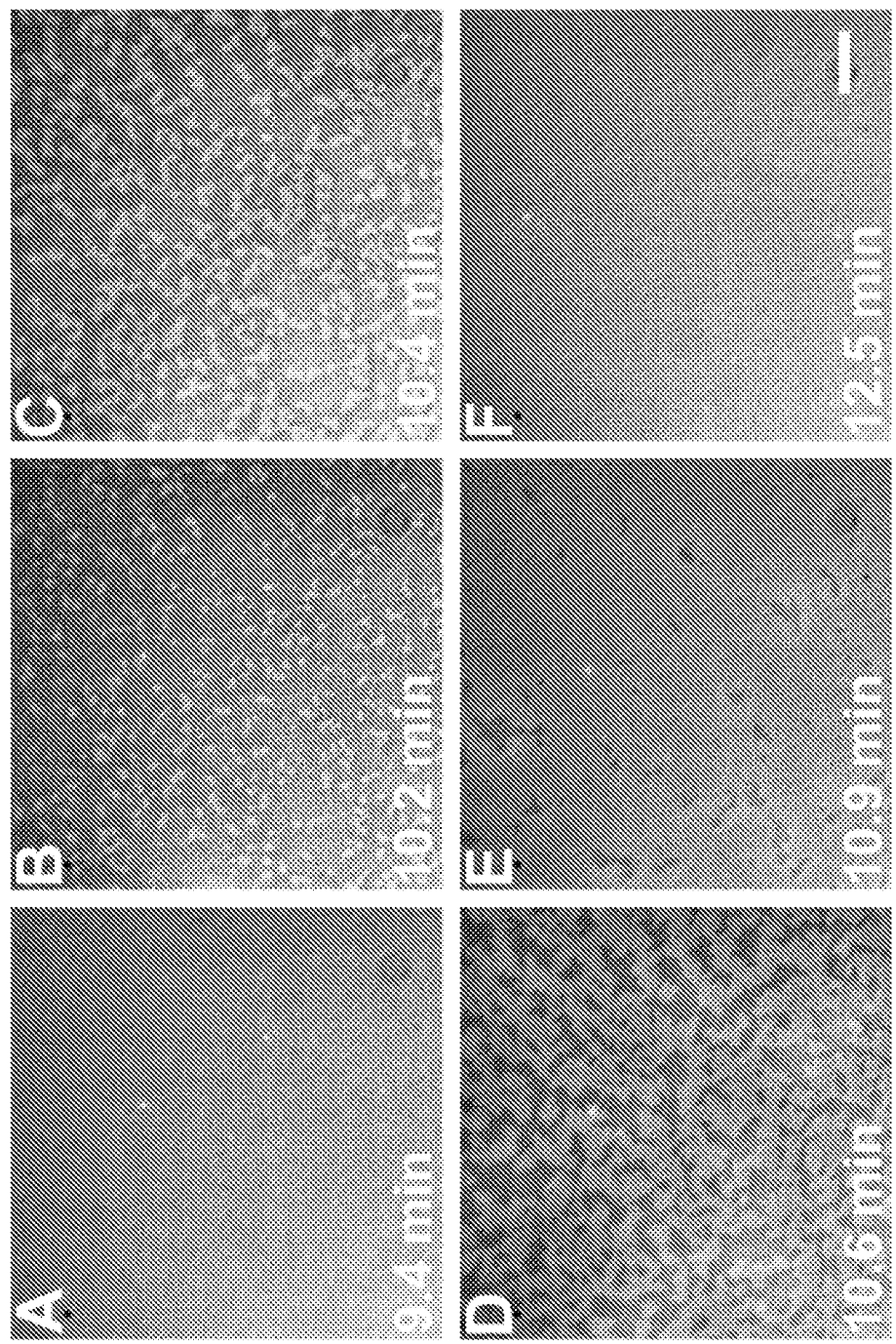
FIG. 11 shows a microscopic observation of SLB formation on a glass surface for a bicellar mixture prepared at a q-ratio of 0.25. (A-F) Image snapshots at various time points depict the rupture of absorbed bicelles as part of the SLB formation process. t=0 minutes corresponds to when bicelle addition was begun and t=9.4 minutes approximates when the CBC value was reached. The scale bar is 20 μm.

A similar process of bicelle rupture and SLB propagation was observed using bicelles at a q-ratio of 0.25 as well (FIG. 11). In this case, the critical bicelle concentration was reached at around t=9.4 min, and this longer time scale compared to bicelles at a q-ratio of 0.05 is attributed to the fact that the average bicelle size increases with greater q-ratio and hence diffusion-limited adsorption onto the substrate would take longer (FIG. 11A). Upon bicelle rupture, the formation of larger SLB fragments was observed than in the case of bicelles with a q-ratio of 0.05 (FIGS. 11B,C). SLB propagation was again fast and occurred over a few minutes, yielding a complete SLB with uniform fluorescence intensity (FIGS. 11D-F).

Example 14: q-Ratio of 2.5

Figure 12:
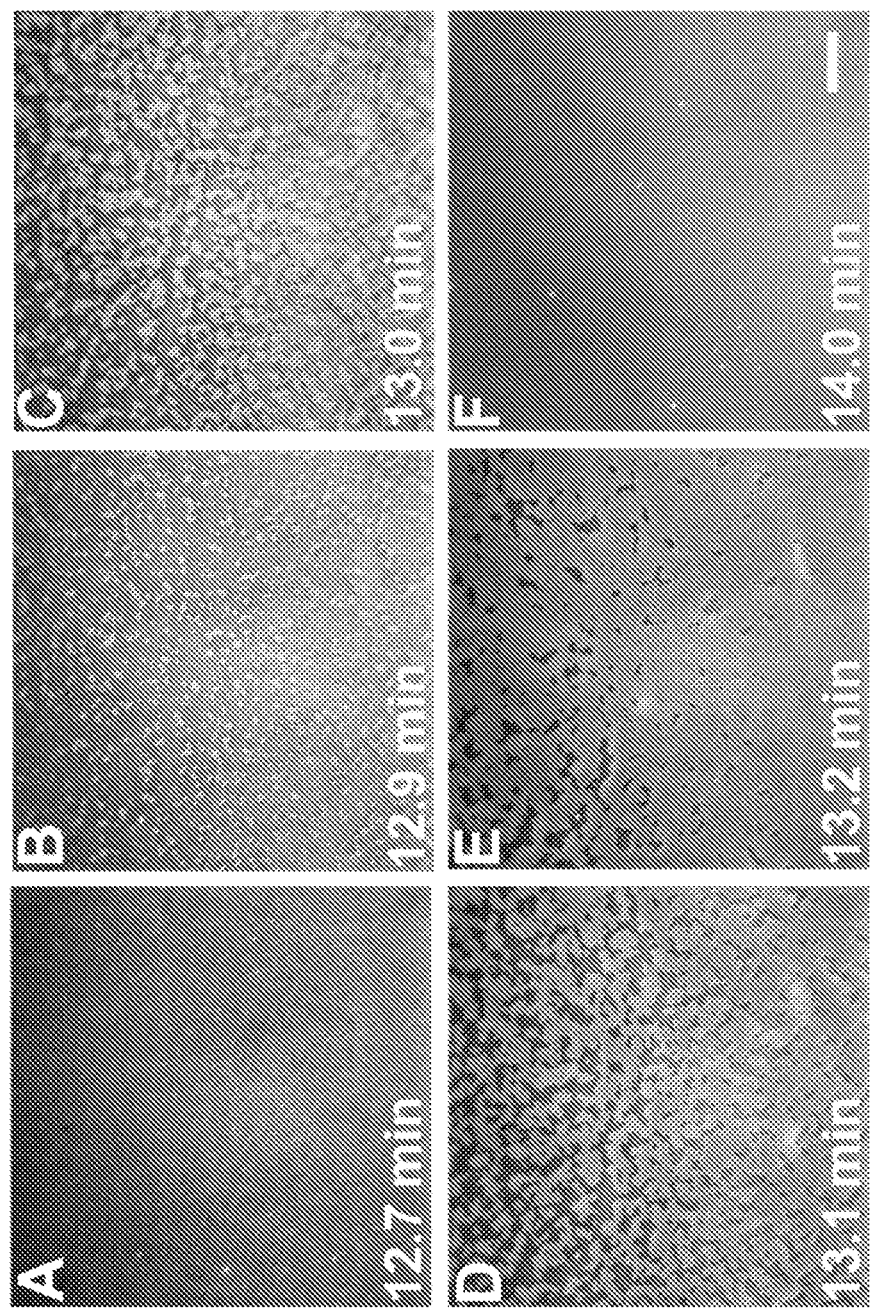
FIG. 12 shows a microscopic observation of SLB formation on a glass surface for a bicellar mixture prepared at a q-ratio of 2.5. (A-F) Image snapshots at various time points depict the rupture of absorbed bicelles as part of the SLB formation process. t=0 minutes corresponds to when bicelle addition has begun and t=12.1 minutes approximates when the critical bicelle concentration (CBC) value was reached. The scale bar is 20 μm.

SLB formation using bicelles at a q-ratio of 2.5 followed a similar trend to the cases described above (FIG. 12). The critical coverage of adsorbed bicelles was reached around t=12.7 minutes (FIG. 12A). The subsequent rupture process yielded larger bilayer fragments than in the aforementioned cases, which is reasonable considering that bicelle size increases with q ratio (FIGS. 12B-C). Once again, completion of the SLB process occurred quickly within a few minutes yielding a complete SLB (FIGS. 12D-F). Hence, independent of q ratio within the tested range, SLB occurred following a similar process and the key parameters that varied, the time scale until reaching the critical coverage and the surface area of bilayer fragments, obeyed the expected dependence on bicelle size in the bulk solution.

In summary, the fluorescence microscopy experiments strongly support the QCM-D experiments by identifying that SLB formation occurs upon reaching a critical number of adsorbed bicelles, which induces bicelle rupture. While the kinetic stages of the process are similar to vesicle adsorption and spontaneous rupture after reaching a critical coverage, it is important to recall that DHPC causes membrane softening and also likely further aids SLB formation by activating the edges of the bilayer patches upon contact with adsorbing bicelles. In this case, DHPC would function as edge-activators, as seen in so-called "elastic" vesicles, and aid bilayer propagation until the SLB formation process is complete.

Example 15: FRAP Characterization

Figure 13:
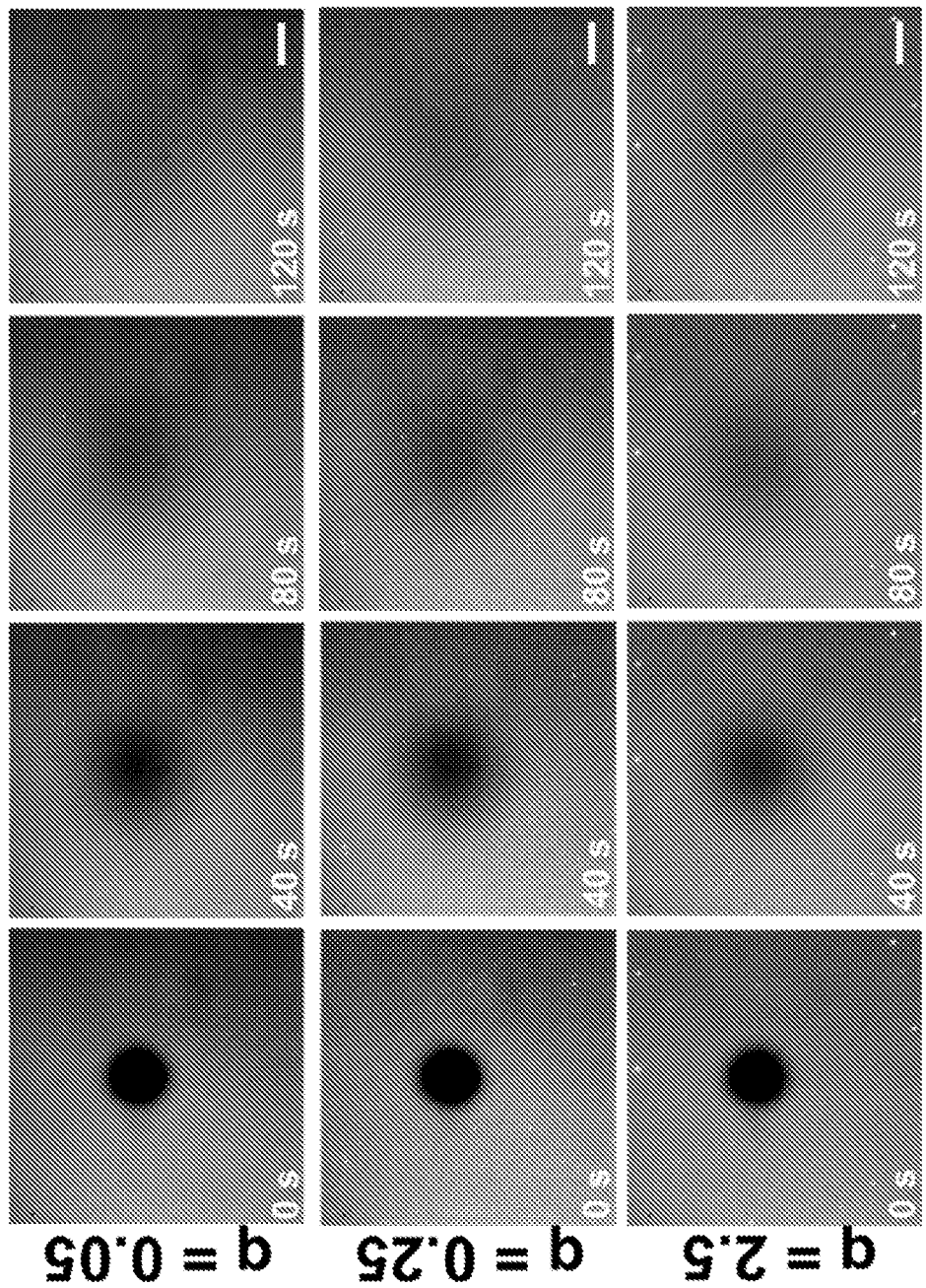
FIG. 13 shows FRAP snapshots of SLBs prepared from bicellar mixtures at different q-ratios. At t=0 min, an image was recorded immediately after photobleaching followed by time-lapsed recording of the fluorescence recovery process.

The lateral lipid diffusion of the fabricated SLBs was also characterized by FRAP measurements for the bicelles prepared at the various q-ratios (with fixed DOPC concentration at 0.031 mM). Time-lapsed FRAP micrographs indicated that nearly complete fluorescence recovery is observed within 2 minutes (FIG. 13). Based on the recovery profiles, the Hankel transform method was applied to extract the diffusion coefficient of lateral lipid mobility within the SLBs. The diffusion coefficients were nearly identical for SLBs at the different q-ratios: 2.22±0.03 $\mu m^2$/s at q=0.05, 2.27±0.05 $\mu m^2$/s at q=0.25, and 2.24±0.04 $\mu m^2$/s at q=2.5. These values agree well with the expected values for a fluidic DOPC SLB on glass. As surfactant-like molecules can influence lateral lipid diffusion in SLBs, it should be noted that the lack of dependence of the measured diffusion coefficient on the q-ratio further supports that DHPC does not affect the DOPC SLB properties, as discussed above. Taken together, the combination of QCM-D, fluorescence microscopy, and FRAP measurement results supports that high-quality DOPC SLBs can be formed at low total phospholipid concentrations and it is particularly recommended to use bicelles with q-ratio values of 0.25 or 2.5.

Example 16: Influence of Bicelle Preparation Conditions

Figure 14:
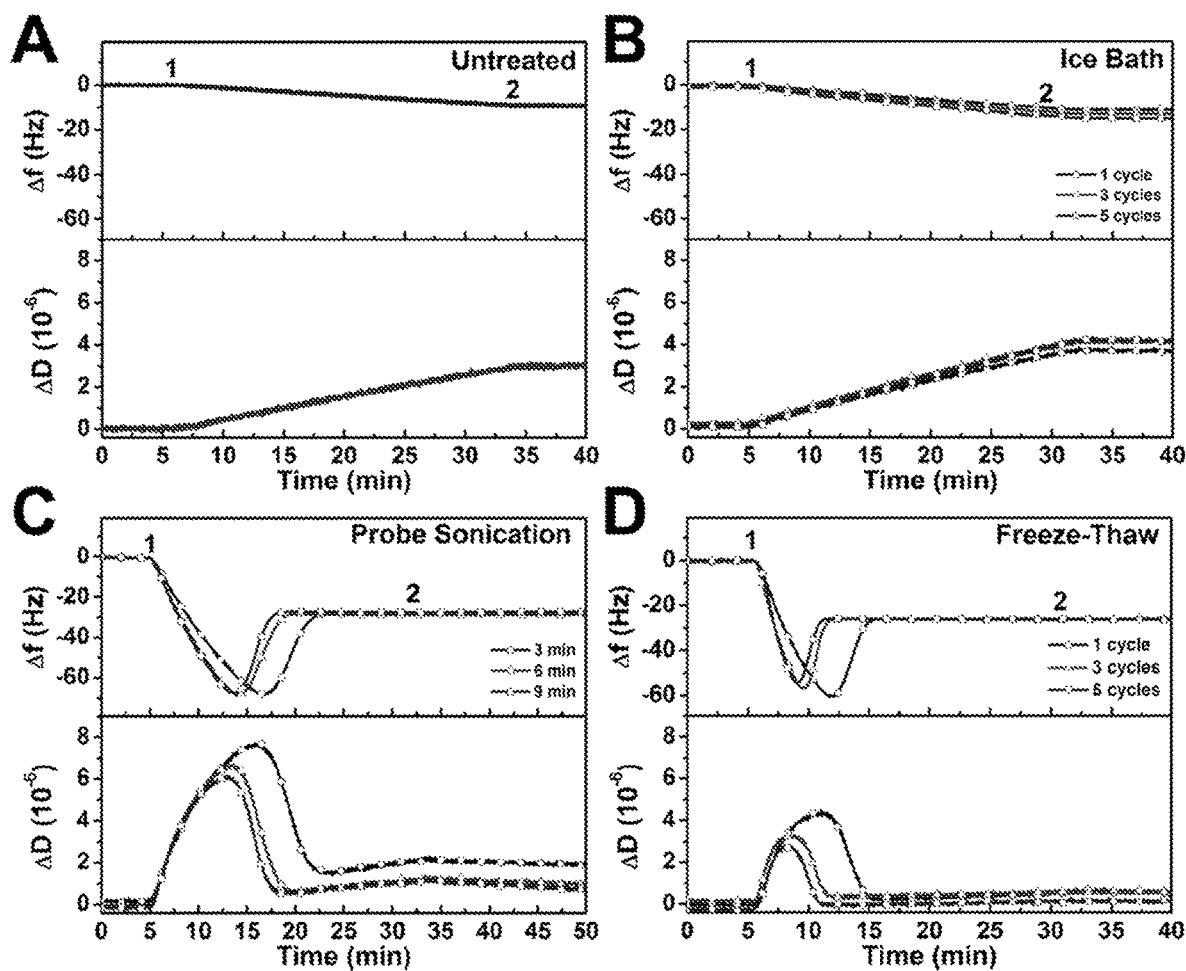
FIG. 14 shows a QCM-D evaluation of different preparation methods to prepare SLBs from bicellar mixtures. (A) Untreated sample. (B) Freeze-thaw-vortex cycling with ice bath incubation. (C) Treatment with probe sonication for varying durations. (D) Freeze-thaw-vortex cycling with liquid nitrogen incubation. In all cases, the bicellar mixtures were prepared at a q-ratio of 0.25 and the DOPC concentration was fixed at 0.063 mM.

Lastly, it was investigated how the preparation of DOPC/DHPC bicellar mixtures (q-ratio of 0.25; 0.063 mM DOPC) influences SLB formation on silicon dioxide, as determined by QCM-D measurements (FIG. 14). While the conventional method to prepare bicelles is relatively simple and involves freeze-thaw-vortex cycles, it was investigated if other treatment conditions (all of which yielded optically clear solutions) could be used instead. When DOPC/DHPC phospholipids were mixed in aqueous buffer to the desired q-ratio without additional treatment, adsorption led to final $\Delta f$ and $\Delta D$ values of −8.0 Hz and $3\times10^{-6}$, respectively (FIG. 14A). Incubation of the DOPC/DHPC bicellar mixtures in an ice bath as part of ice-thaw-vortex cycling was also unsuccessful, yielding similar QCM-D measurement responses to the untreated cases, even though this procedure has been reported to form bicelles (FIG. 14B). It is likely that the solution temperature in the ice bath never reached below the eutectic temperature of the bicellar mixture that is necessary to cause fragmentation. On the other hand, probe sonication of bicellar mixtures appeared to be more promising and yielded SLBs with final $\Delta f$ values around −25 Hz although the $\Delta D$ shifts were greater than $1\times10^{-6}$, respectively (FIG. 14C). Altogether, these experiments identified that freeze-thaw-vortex cycling is a necessary step, likely because it causes larger, multilamellar aggregates to fragment into smaller, unilamellar aggregates, as has also been seen to improve SLB formation when using zwitterionic lipid vesicles. Indeed, treatment with one cycle of freeze-thaw-vortexing yielded SLBs with final $\Delta f$ and $\Delta D$ values of around −25 Hz and $0.8\times10^{-6}$, respectively (FIG. 14D). An increasing number of freeze-thaw-vortexing cycles further improved SLB quality based on lower energy dissipation values, presumably by reducing the number of unruptured, adsorbed bicelles on the substrates. Collectively, the findings support that freeze-thaw-vortex cycling is an important step in bicelle preparation in order to prepare high-quality SLBs.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:
1. A method of preparing a solid-supported phospholipid bilayer, the method comprising:
 a) a first step of providing a solution comprising a bicellar mixture of a long-chain phospholipid and a short-chain phospholipid;
 b) at least one second step of decreasing the temperature of the solution to below 0° C., increasing the temperature to above room temperature and causing the solution to be blended; and
 c) a third step of depositing the solution obtained after the second step on a surface of a support, wherein a concentration of the long-chain phospholipid in the solution is at most 0.1 mg/mL, for obtaining a solid-supported phospholipid bilayer.

2. The method of claim 1, wherein the long-chain phospholipid is a phospholipid comprising two fatty acid residues, wherein each of the fatty acid residues has more than 10 carbons.

3. The method of claim 1, wherein at least one of the long-chain phospholipid and the short-chain phospholipid is a phosphatidylcholine.

4. The method of claim 1, wherein the long-chain phospholipid has a gel-to-fluid-phase transition temperature of below 0° C.

5. The method of claim 1, wherein the short-chain phospholipid is a phospholipid comprising two fatty acid residues, wherein each of the fatty acid residues has at most 10 carbons.

6. The method of claim 1, wherein at least one of the long-chain phospholipid and the short-chain phospholipid comprises an unsaturated fatty acid residue.

7. The method of claim 1, wherein the short-chain phospholipid is 1,2-dihexyanoyl-sn-glycero-3-phosphocholine and the long-chain phospholipid is 1,2-dioleoyl-sn-glycero-3-phosphocholine.

8. The method of claim 1, wherein the concentration of the long-chain phospholipid in the solution of the third step is below 0.05 mg/mL.

9. The method of claim 1, wherein the long-chain phospholipid and the short-chain phospholipid are provided in a molar ratio of about 1:0.02 to about 1:5.

10. The method of claim 1, wherein the solution of the second step after blending is diluted in order to obtain the concentration of the long-chain phospholipid in the solution being at most 0.1 mg/mL.

11. The method of claim 1, wherein the solvent used to make the solution is a water-based buffer solution.

12. The method of claim 1, wherein the support is an inorganic material.

13. The method of claim 1, wherein the surface of the support is substantially planar.

14. The method of claim 1, wherein the surface of the support is nanostructured.

15. The method of claim 1, wherein in the third step, the bicellar mixture ruptures in order to obtain the solid-supported phospholipid bilayer.

16. The method of claim 1, wherein decreasing the temperature of the solution to below 0° C. in the at least one second step comprises decreasing the temperature of the solution to below −10° C.

17. The method of claim 1, wherein increasing the temperature to above room temperature in the at least one second step comprises increasing the temperature to above 30° C.

18. The method of claim 1, wherein the second step is repeated for about at least 2 times.

19. The method of claim 1, wherein the obtained solid-supported phospholipid bilayer is a planar phospholipid bilayer on the support.

* * * * *